Aug. 28, 1962

M. M. PLATZMAN ETAL 3,051,079

TABULATING CARD PERFORATING APPARATUS

Filed June 7, 1960

INVENTORS.
MICHAEL M. PLATZMAN
LINCOLN M. KEEFE

Aug. 28, 1962  M. M. PLATZMAN ETAL  3,051,079
TABULATING CARD PERFORATING APPARATUS
Filed June 7, 1960  19 Sheets-Sheet 2

INVENTORS.
MICHAEL M. PLATZMAN
LINCOLN M. KEEFE

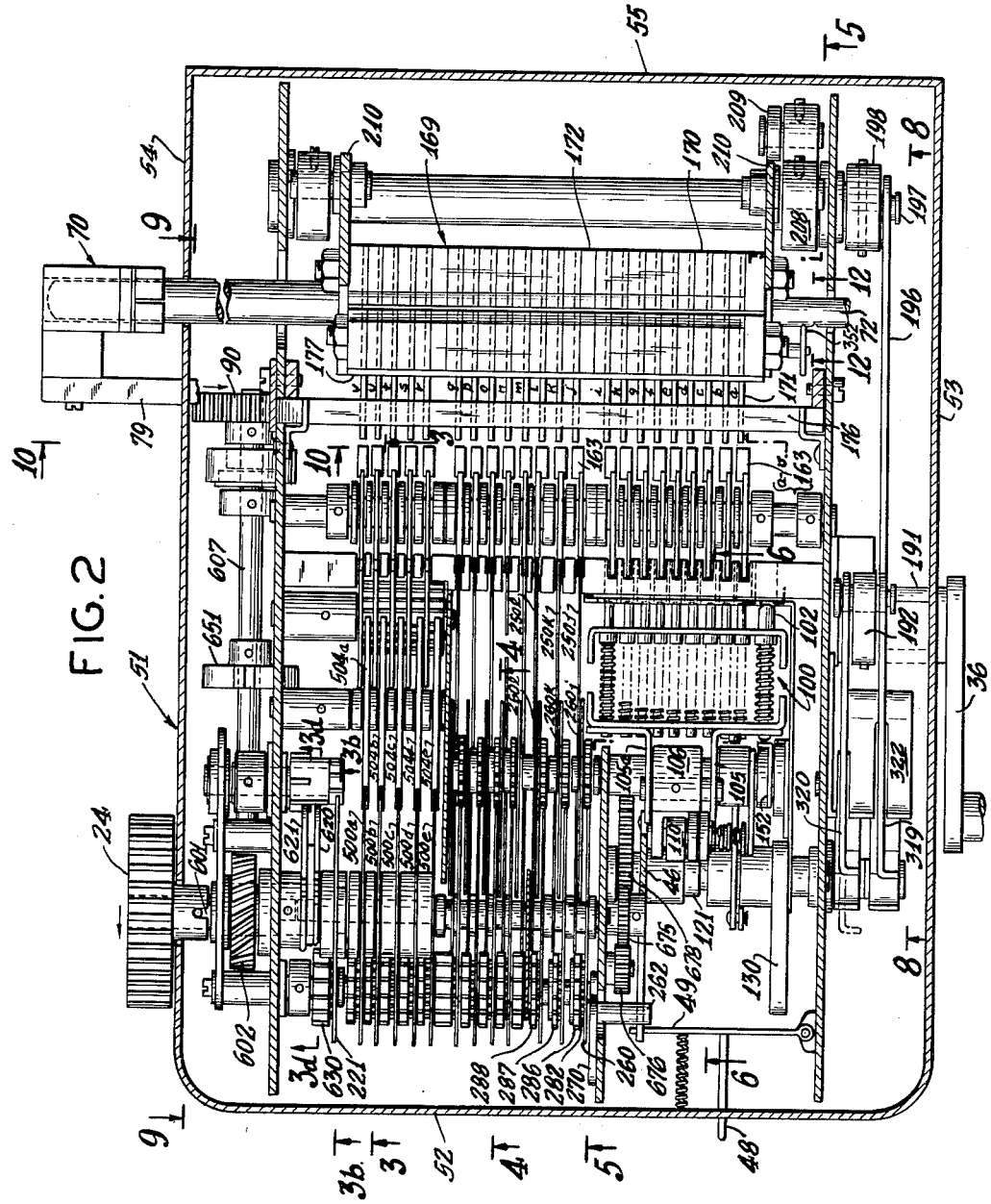

INVENTORS.
MICHAEL M. PLATZMAN
LINCOLN M. KEEFE

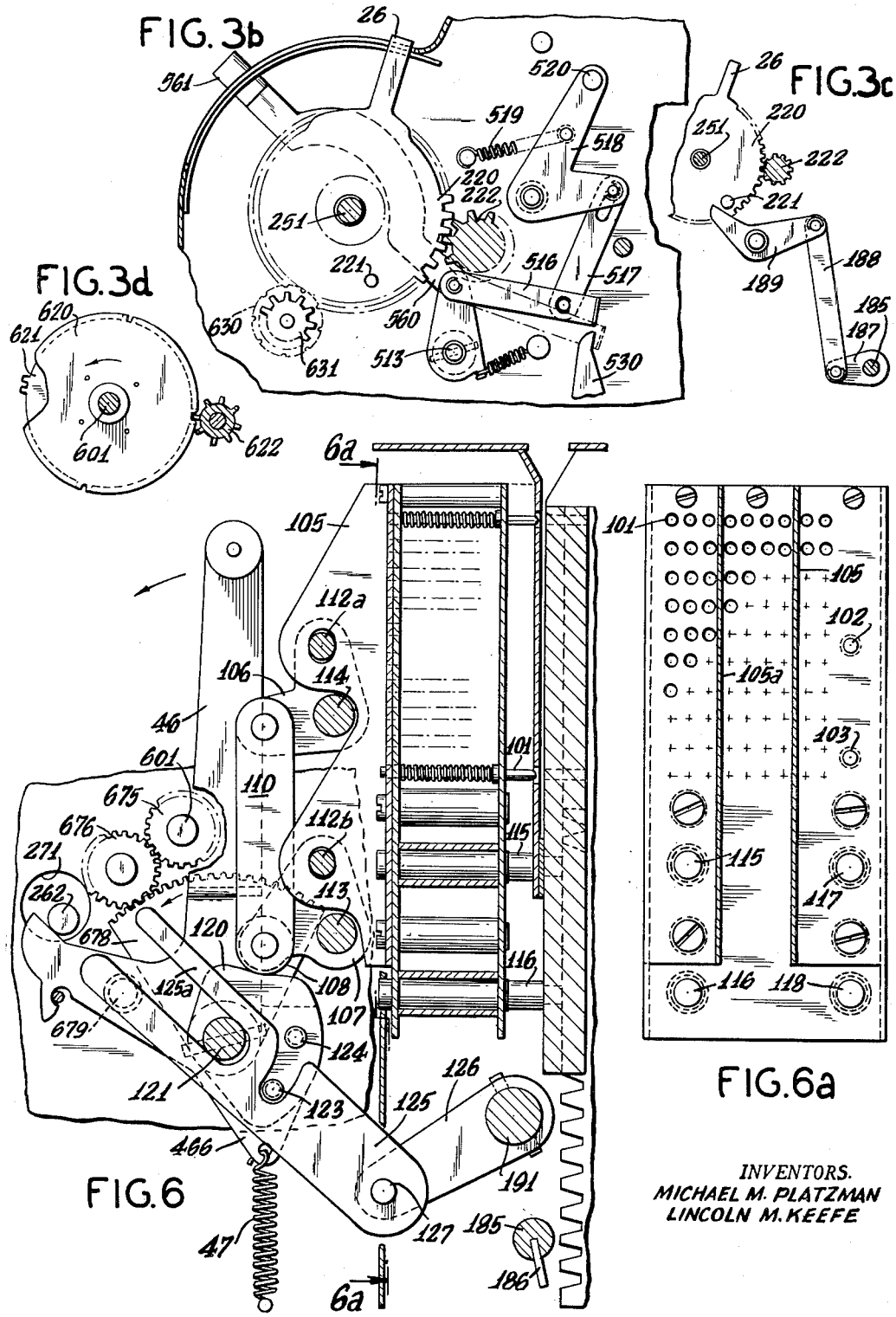

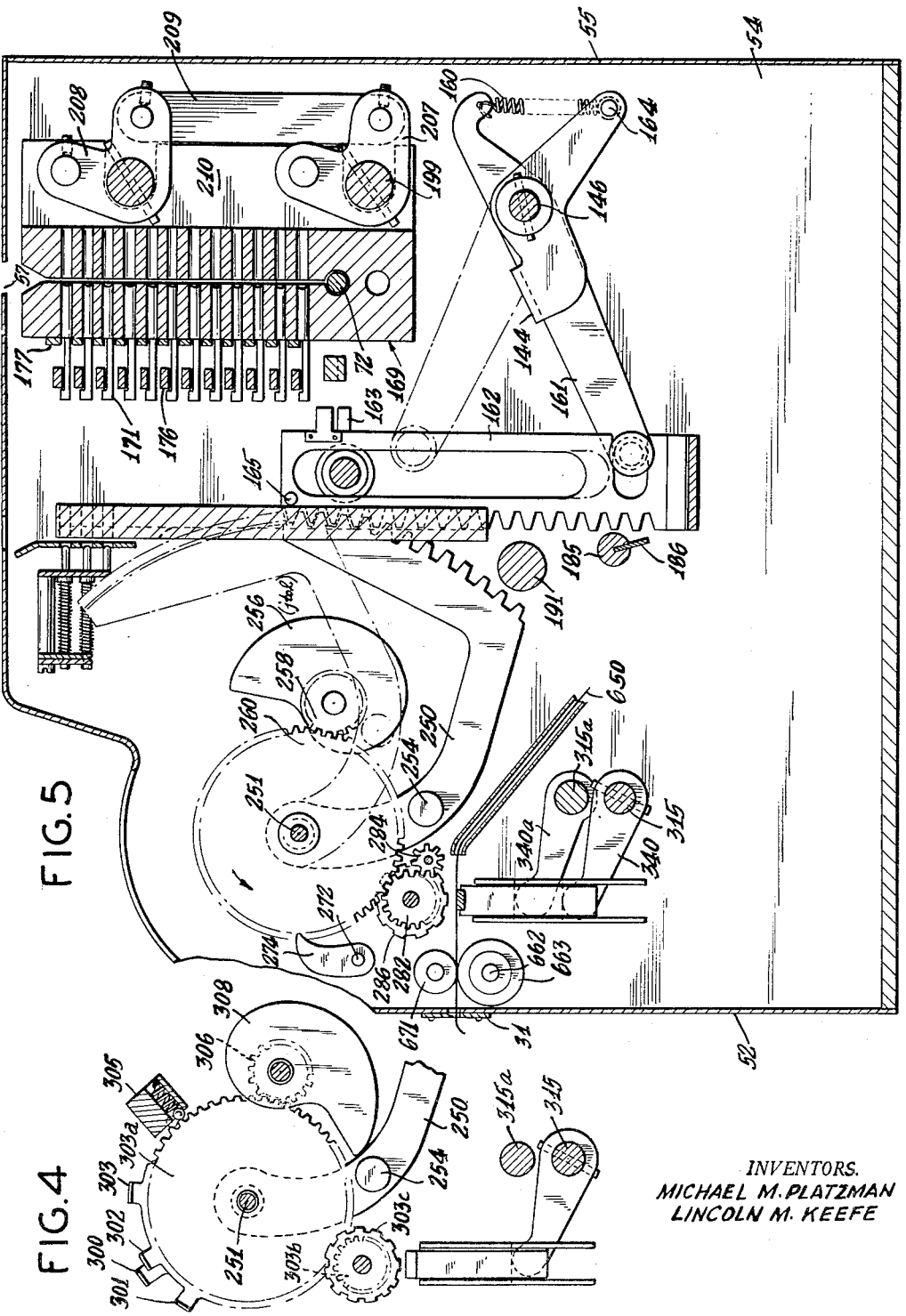

Aug. 28, 1962    M. M. PLATZMAN ETAL    3,051,079
TABULATING CARD PERFORATING APPARATUS
Filed June 7, 1960    19 Sheets-Sheet 7

INVENTORS.
MICHAEL M. PLATZMAN
LINCOLN M. KEEFE

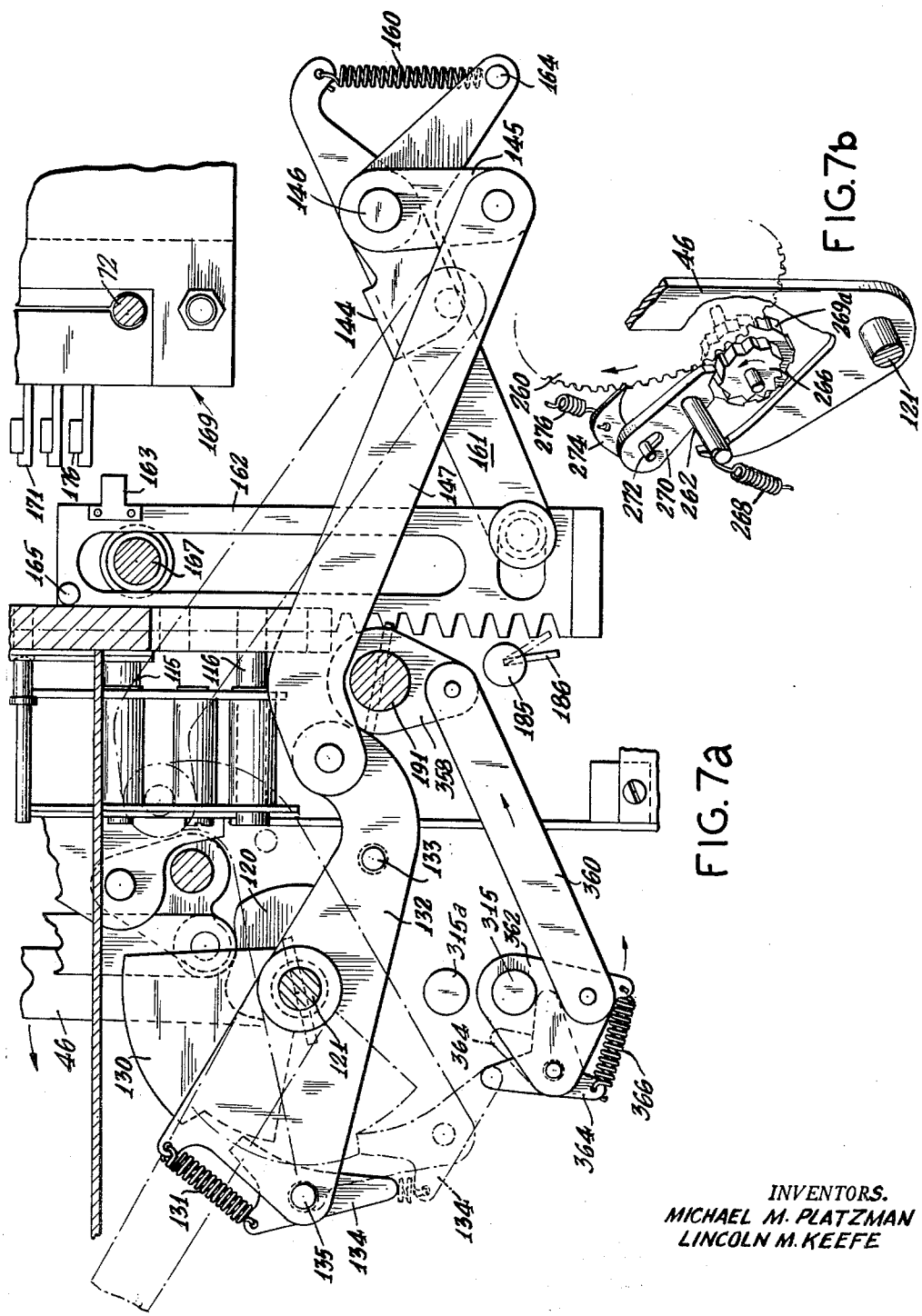

Aug. 28, 1962    M. M. PLATZMAN ETAL    3,051,079
TABULATING CARD PERFORATING APPARATUS
Filed June 7, 1960    19 Sheets-Sheet 9
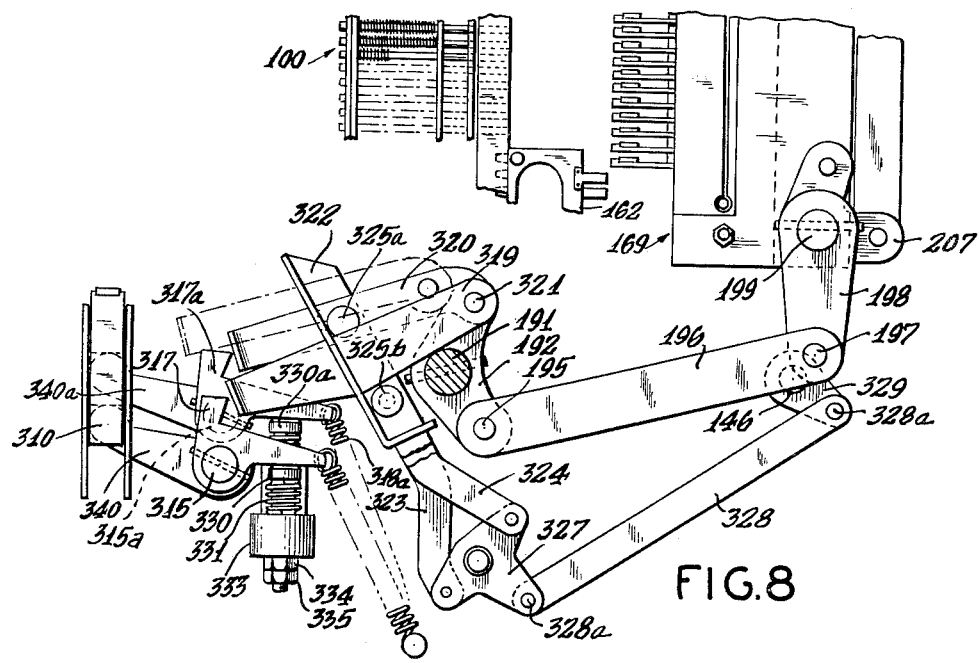
FIG. 8
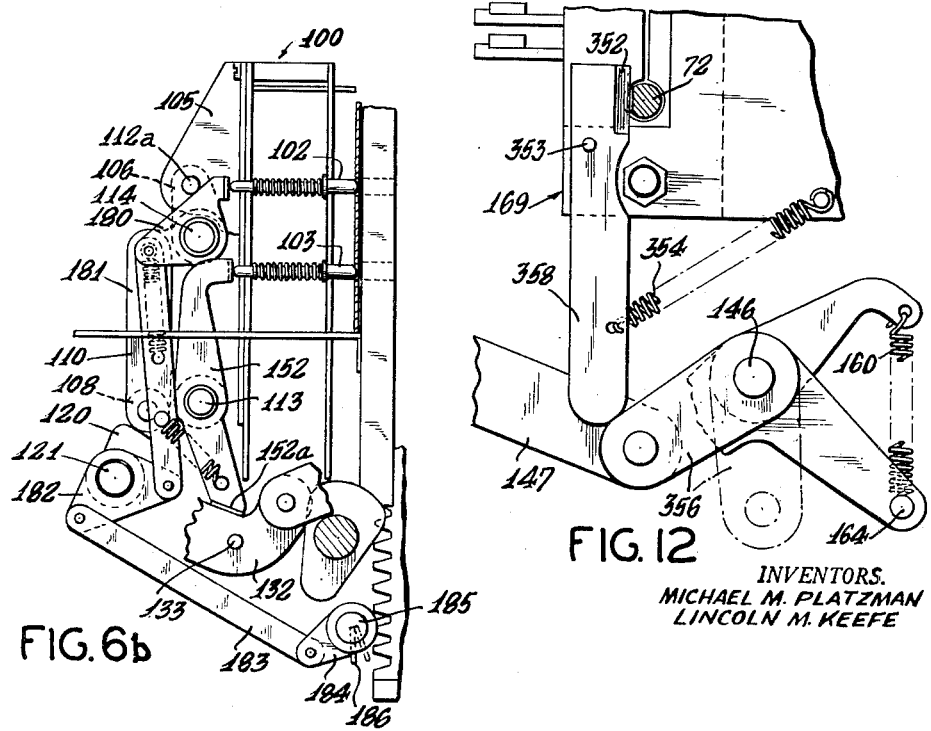
FIG. 6b
FIG. 12
INVENTORS.
MICHAEL M. PLATZMAN
LINCOLN M. KEEFE

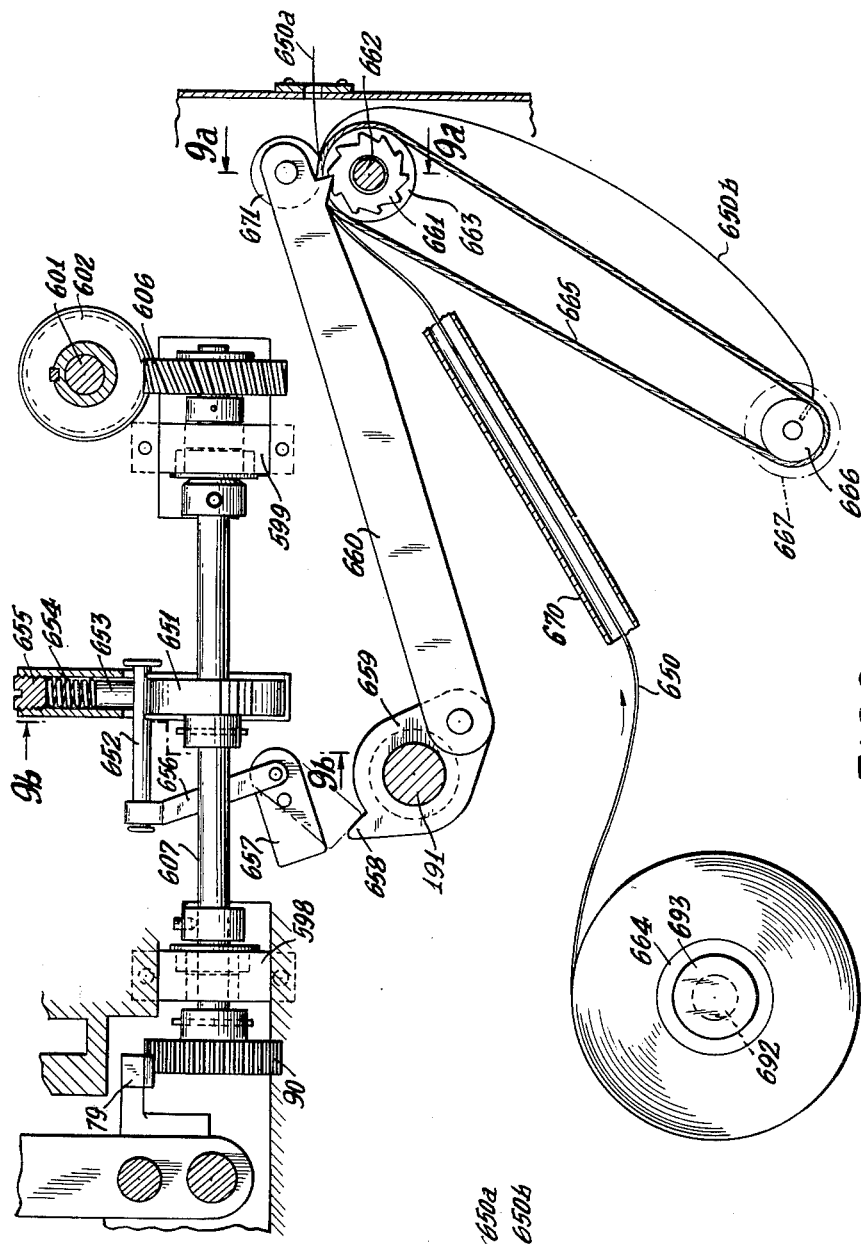

Aug. 28, 1962　　　M. M. PLATZMAN ETAL　　　3,051,079
TABULATING CARD PERFORATING APPARATUS
Filed June 7, 1960　　　　　　　　　　　　　　　19 Sheets-Sheet 11
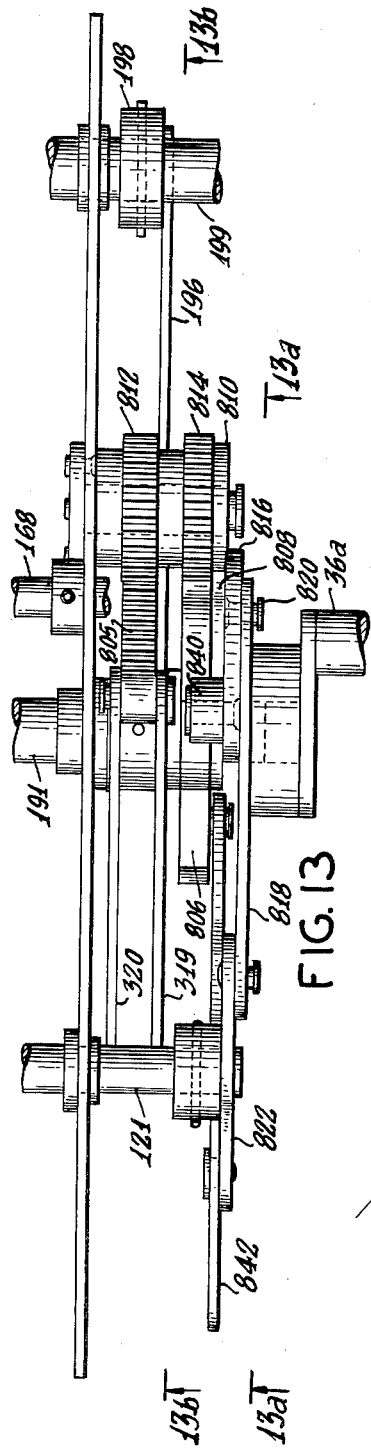
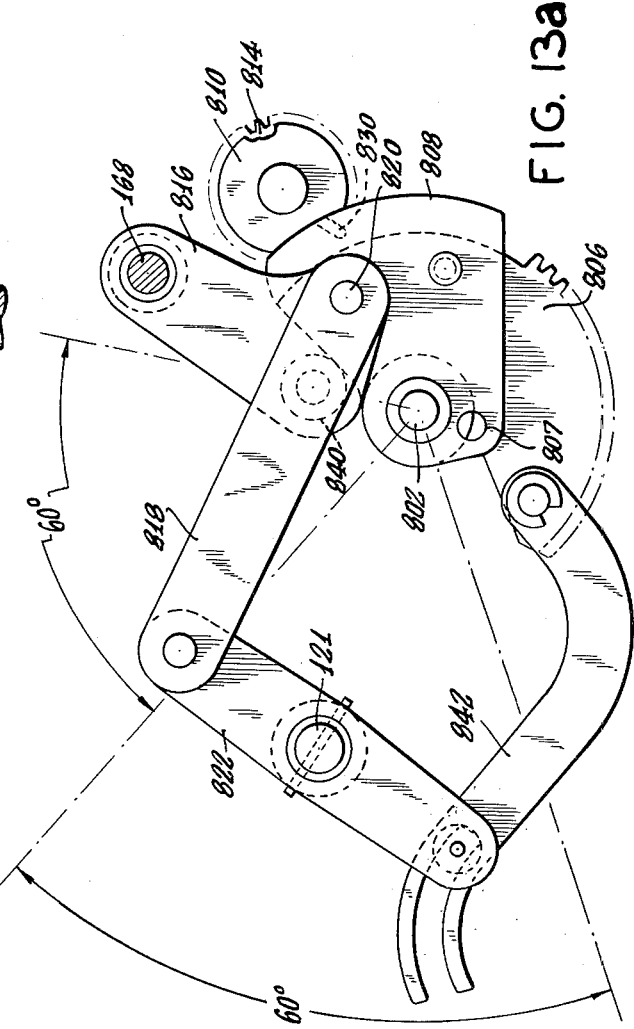
INVENTORS.
MICHAEL M. PLATZMAN
LINCOLN M. KEEFE Aug. 28, 1962   M. M. PLATZMAN ETAL   3,051,079
TABULATING CARD PERFORATING APPARATUS Filed June 7, 1960   19 Sheets-Sheet 12

INVENTORS.
MICHAEL M. PLATZMAN
LINCOLN M. KEEFE

Aug. 28, 1962 M. M. PLATZMAN ETAL 3,051,079
TABULATING CARD PERFORATING APPARATUS
Filed June 7, 1960 19 Sheets-Sheet 13

INVENTORS.
MICHAEL M. PLATZMAN
LINCOLN M. KEEFE

Aug. 28, 1962  M. M. PLATZMAN ETAL  3,051,079
TABULATING CARD PERFORATING APPARATUS
Filed June 7, 1960  19 Sheets-Sheet 14
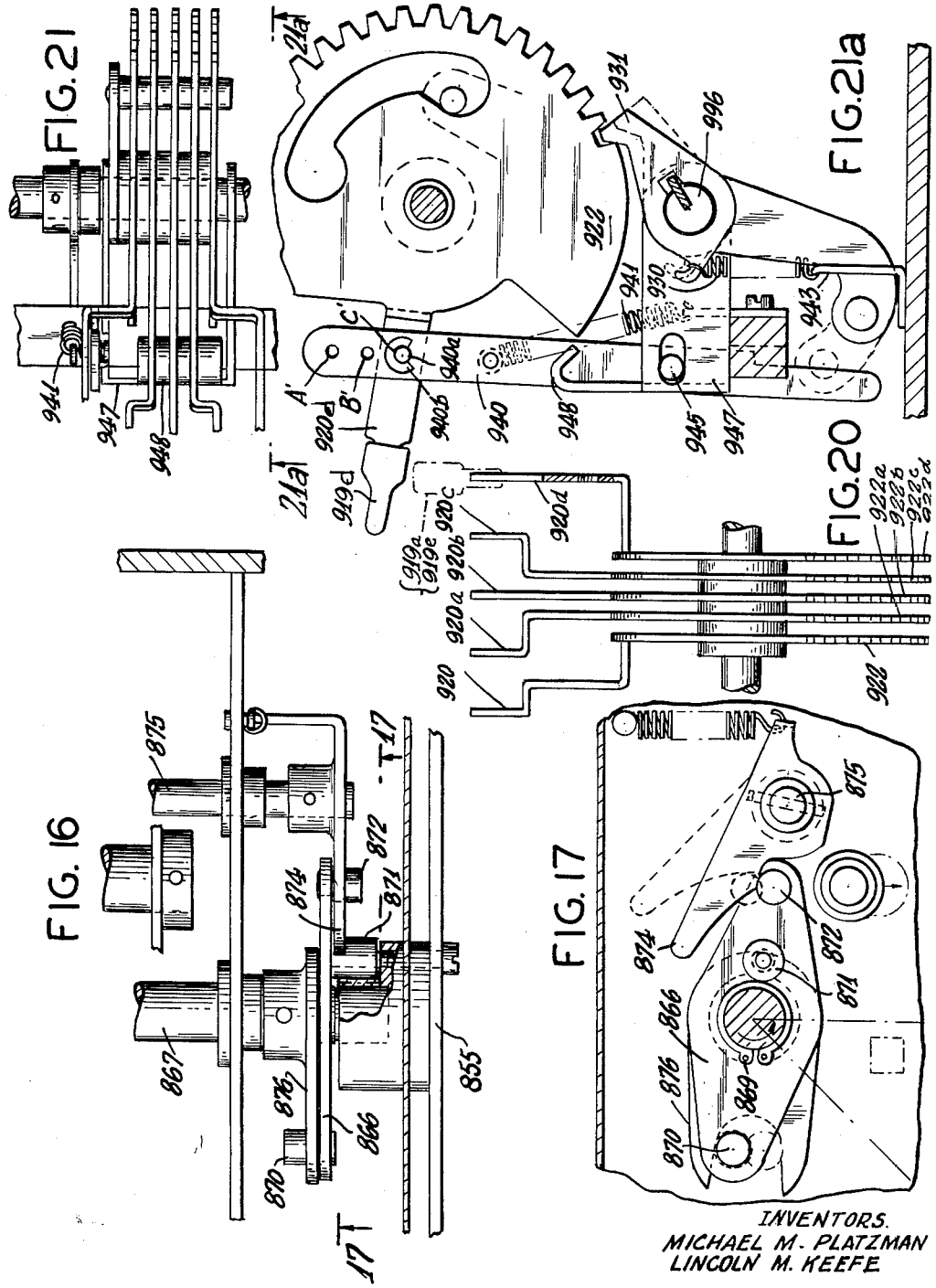
INVENTORS.
MICHAEL M. PLATZMAN
LINCOLN M. KEEFE Aug. 28, 1962 M. M. PLATZMAN ETAL 3,051,079
TABULATING CARD PERFORATING APPARATUS
Filed June 7, 1960 19 Sheets-Sheet 15

INVENTORS.
MICHAEL M. PLATZMAN
LINCOLN M. KEEFE

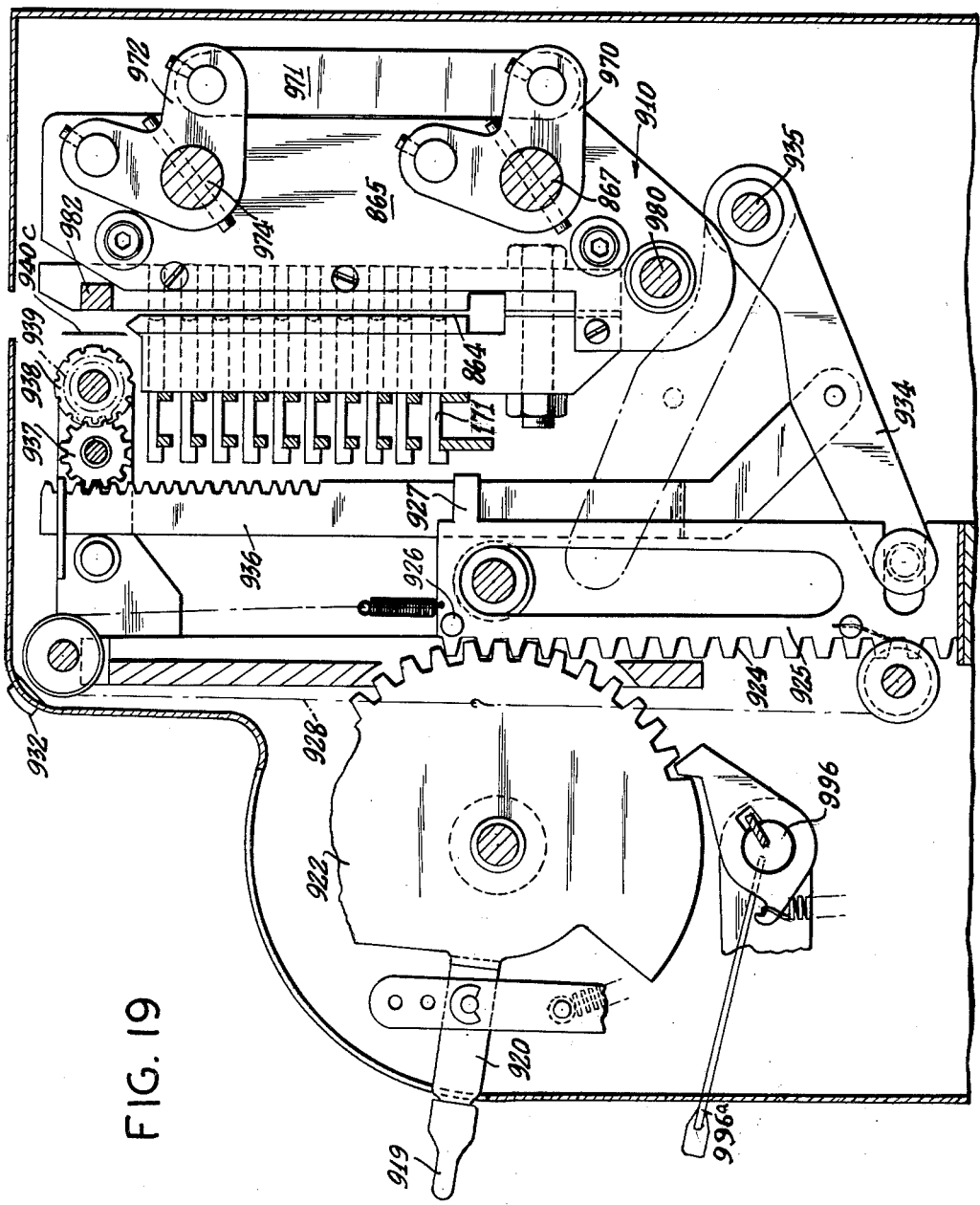

Aug. 28, 1962 M. M. PLATZMAN ETAL 3,051,079
TABULATING CARD PERFORATING APPARATUS
Filed June 7, 1960 19 Sheets-Sheet 18
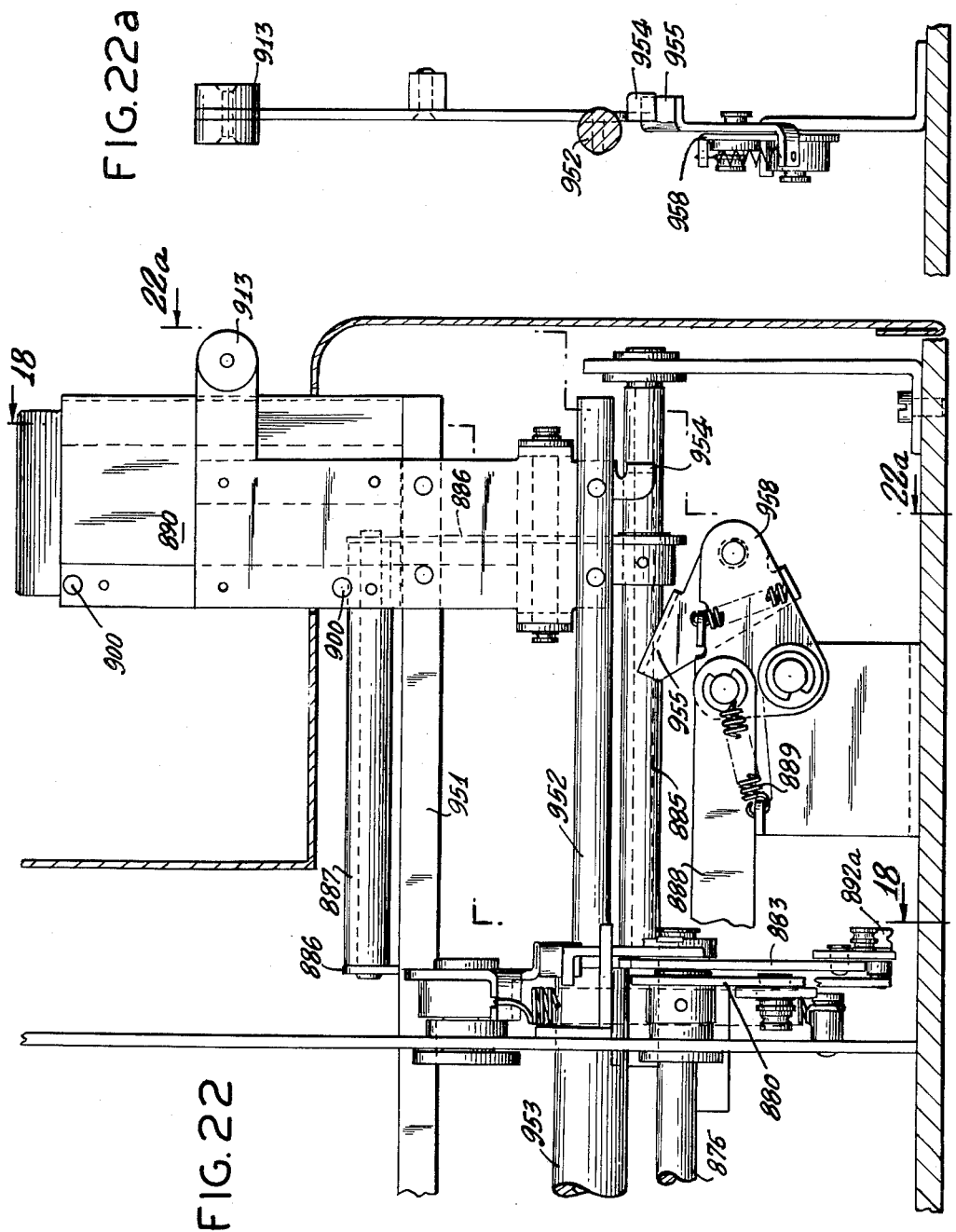
INVENTORS.
MICHAEL M. PLATZMAN
LINCOLN M. KEEFE Aug. 28, 1962 M. M. PLATZMAN ETAL 3,051,079
TABULATING CARD PERFORATING APPARATUS
Filed June 7, 1960 19 Sheets-Sheet 19

INVENTORS.
MICHAEL M. PLATZMAN
LINCOLN M. KEEFE

United States Patent Office

3,051,079
Patented Aug. 28, 1962

3,051,079
TABULATING CARD PERFORATING APPARATUS
Michael M. Platzman, Brooklyn, and Lincoln M. Keefe, Elmhurst, N.Y., assignors to National Automation Corp., Jamaica, N.Y.
Filed June 7, 1960, Ser. No. 34,422
6 Claims. (Cl. 101—19)

This invention relates to a tabulator card punching and paper printing machine. It is particularly directed to a tabulating card punch device and data reproducer controlled by punched identification cards and having incorporated a tear-off and re-roll tape data printer.

This device may be used for all kinds of charge account and credit systems, for production control, inventory control, money orders, bank checks and for other like purposes.

An object of this invention is to provide a machine for recording data on a tabulator card and which will have the following features:

Provide means to punch data onto the tabulator card from two different identification cards which are inserted into the machine selectively and which will also punch manually set amounts;

Provide means to punch a serial number on the tabulator card and print the serial number on a tear-off record and on a duplicate, and automatically advance the serial number;

Provide means to manually set the month, day and year and punch same on a tabulating card and print same on a tear-off tape and on a duplicate printed record;

Provide a manually operable keyboard for setting the amount of a transaction to be punched onto the tabulator card and, at the same time, print the amount on a tear-off tape and on a duplicate printed record;

Provide a manually operated item selector knob and associated selected item indicator means for positioning the tabulator card so that the item is punched in proper field of the card, and to print the item designation on the tear-off tape and on a duplicate printed record;

Provide means for visually indicating the amount of the item set on the keyboard;

Include means whereby upon removal of the identification card, the amount selector levers and item selector automatically return to their initial positions;

Include means whereby all punched data is punched in alternate columns thus permitting the design of rugged equipment of compact design;

Include means whereby operation will not be permitted unless the identification card is properly oriented or positioned;

Include the provision of locking means which may be operated to hold a properly positioned identification card so that it cannot be removed; and Include means to insert feeler pins through punch holes in the identification card and means controlled by said feeler pins for punching into a tabulator card the coding of the identification card.

Another feature of the machine is the provision of a plurality of punch and print quick-set amount levers which may be operated to record data in each of a plurality of areas of a tabulator card.

A particular feature of the invention is the provision of a combination punch and retainer die and a tabulator card holder and carriage and means to move the die in an arc against interposer anvils which back up the punches and cause holes to be punched into the tabulator card.

Still a further object of this invention is to provide a strong, rugged, and durable machine of the character described, which shall be inexpensive to manufacture, which shall be easy to manipulate, and which shall be sure and positive in operation and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described.

In the accompanying drawings in which are shown various illustrative embodiments of this invention:

FIG. 2 is a horizontal cross-sectional view illustrating the inside of the machine;

FIG. 3b is a cross-sectional view taken along line 3b—3b of FIG. 2;

FIG. 3c is a vertical cross-sectional view, illustrating the mechanism for automaticallyy moving the knob and item indicator from Field A to Field B;

FIG. 3d is a cross-sectional view taken along line 3d—3d of FIG. 2;

FIG. 4 is a cross-sectional view taken along line 4—4 of FIG. 2;

FIG. 5 is a cross-sectional view taken along line 5—5 of FIG. 2;

FIG. 6 is a cross-sectional view taken along line 6—6 of FIG. 2;

FIG. 6a is a cross-sectional view taken along line 6a—6a of FIG. 6, showing the pin cage;

FIG. 6b is a view somewhat similar to FIG. 6, and illustrating the mechanism for controlling the identification punch-control pin cage;

FIG. 7a is a cross-sectional view taken along line 7a—7a of FIG. 7;

FIG. 7b is a perspective showing of a serial number advance mechanism;

FIG. 8 is a cross-sectional view taken along line 8—8 of FIG. 2;

FIG. 9 is a cross-sectional view taken along line 9—9 of FIG. 2;

FIG. 9a is a cross-sectional view taken along line 9a—9a of FIG. 9;

FIG. 9b is a cross-sectional view taken along line 9b—9b of FIG. 9;

FIG. 12 is a cross-sectional view taken along line 12—12 of FIG. 2;

Figure 13B:
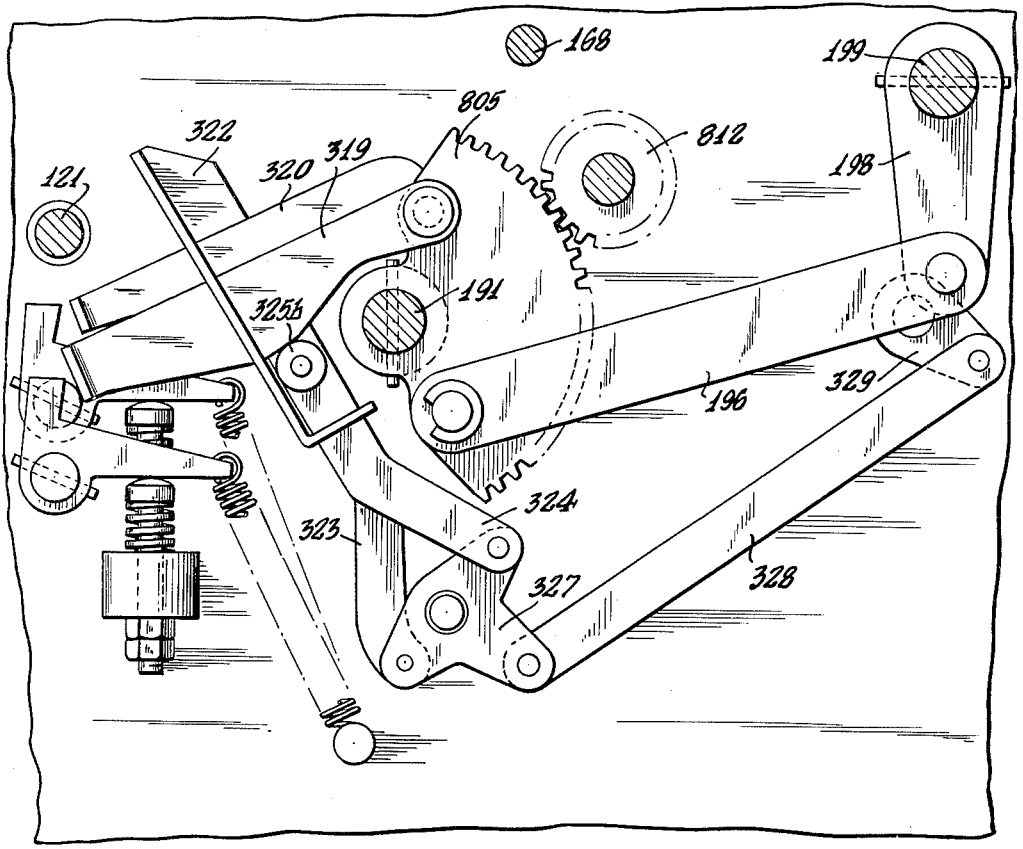
FIG. 13 is a top plan view of an alternative actuating mechanism.
Figure 14:
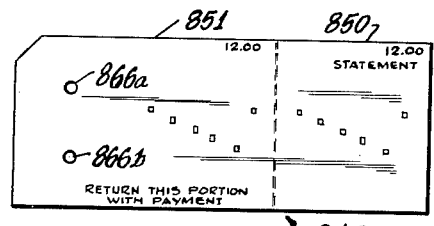
Figure 15:
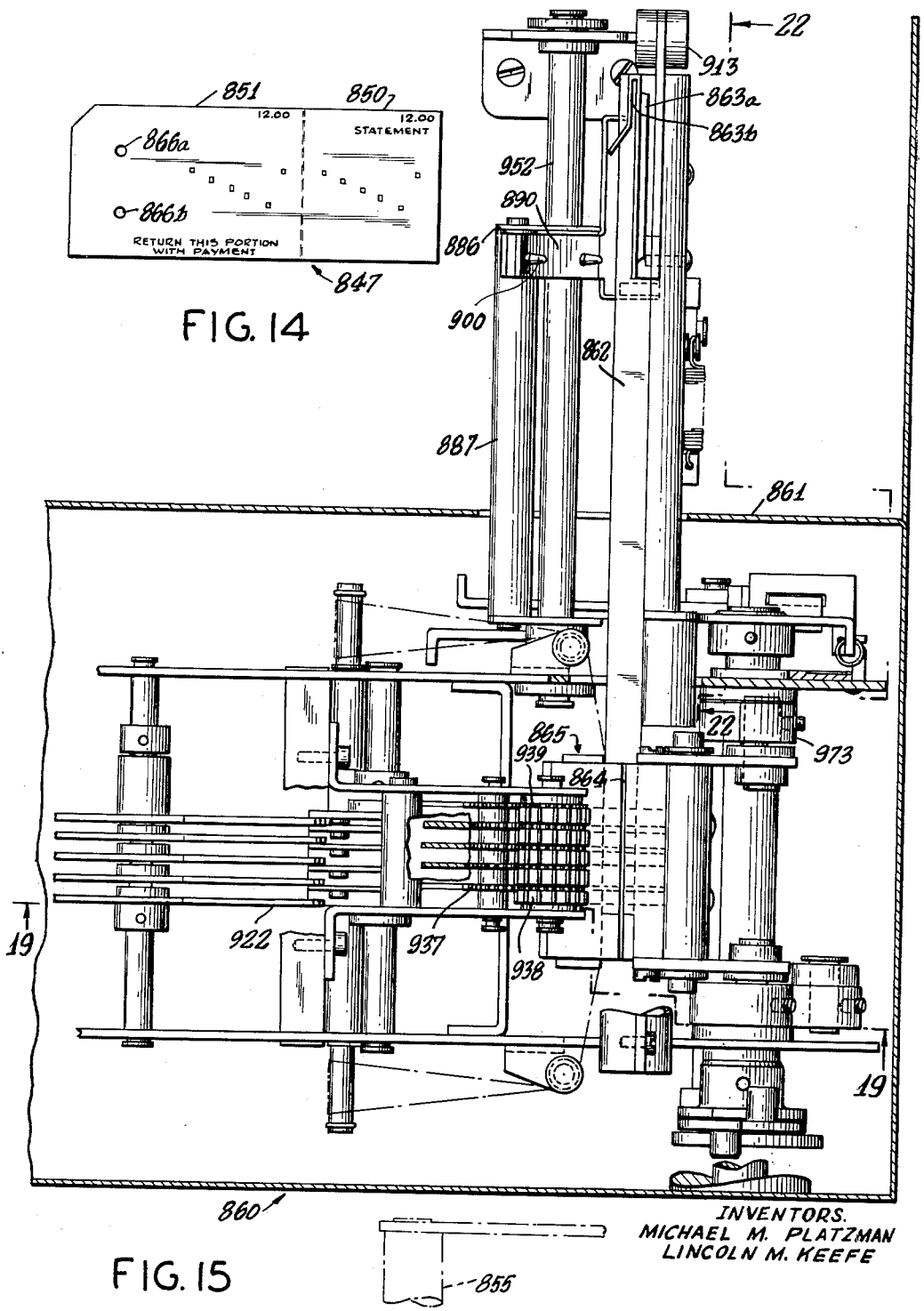
Figure 18:
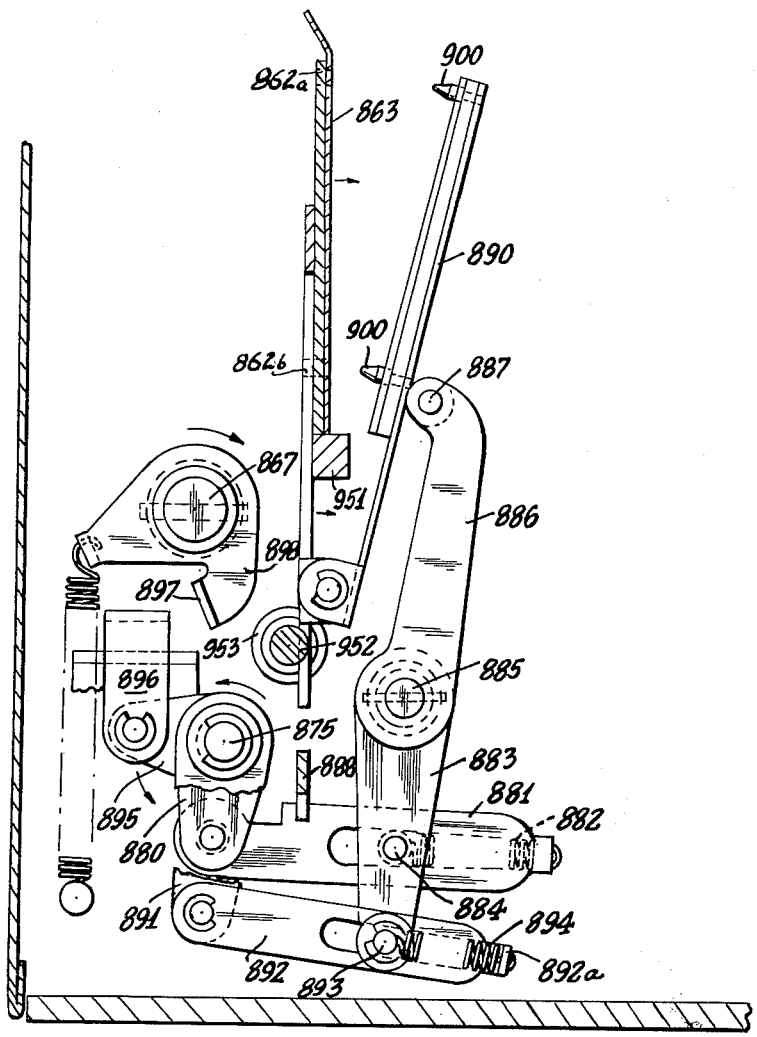
Figure 21B:
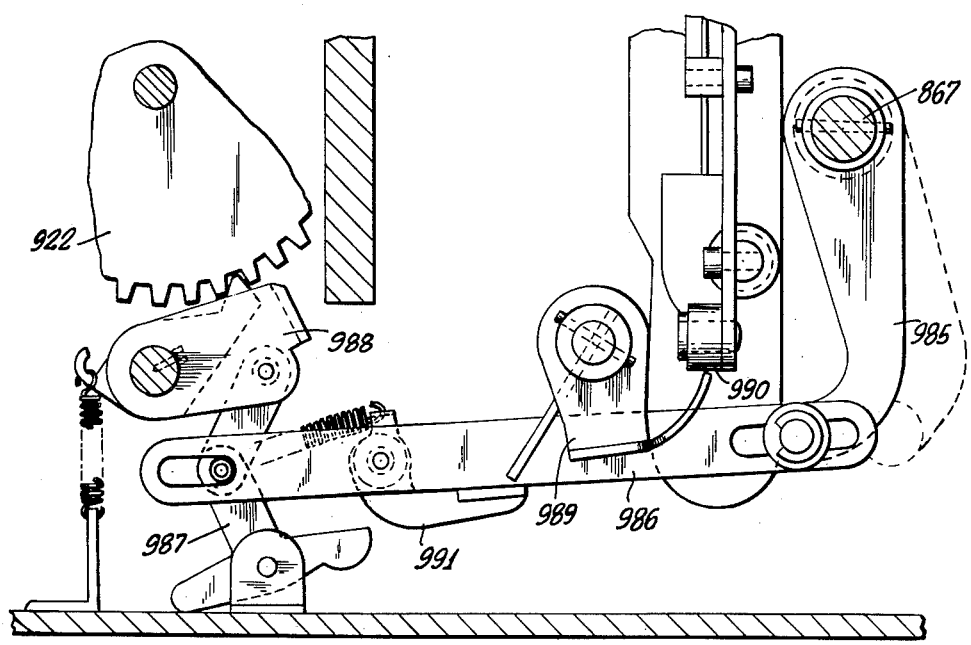
Figure 21C:
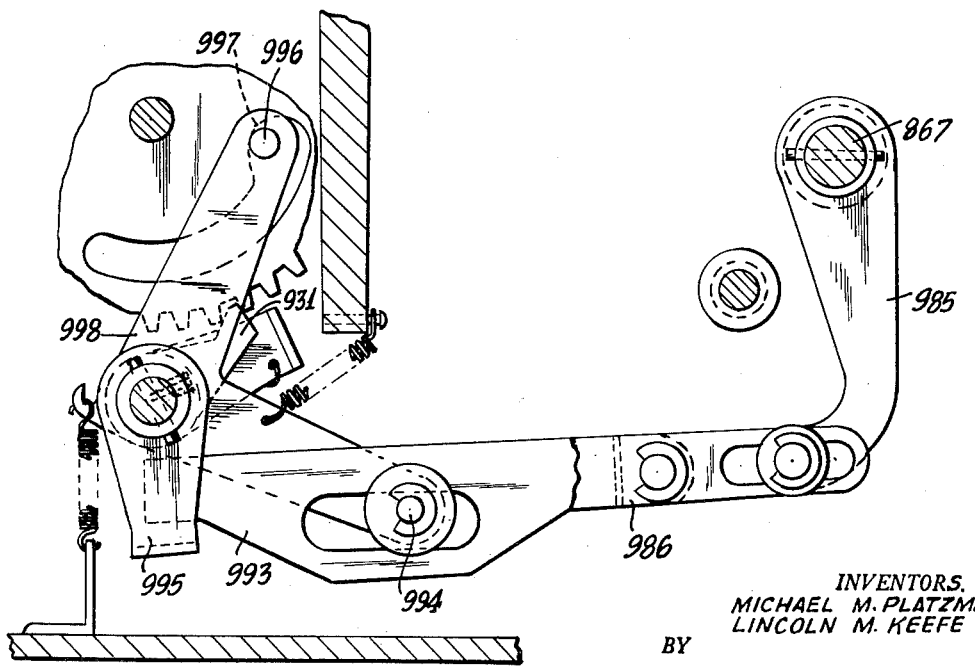
Figure 23:
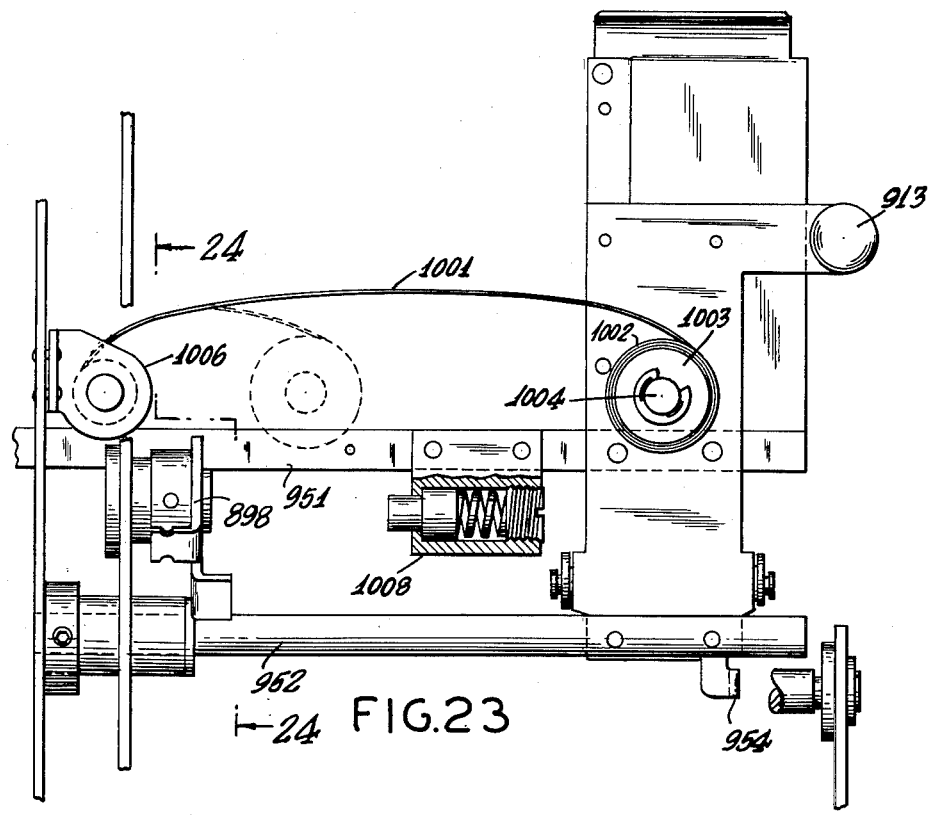

FIGS. 13a and 13b are cross-sectional views taken along lines 13a—13a and 13b—13b respectively of FIG. 13;

FIG. 14 shows a duplicate record tabulating card;

FIG. 15 is a plan view of a machine for processing the card of FIG. 14, with the casing broken away;

FIG. 16 is a detail of the portion of the actuating mechanism coupled to the operating handle;

FIG. 17 is a cross-sectional view taken along line 17—17 of FIG. 16;

FIG. 18 is a cross-sectional view taken along line 18—18 of FIG. 22;

FIG. 19 is a cross-sectional view taken along line 19—19 of FIG. 15;

FIG. 20 is a plan view of digit set levers and sector gears;

FIG. 21 is a plan view showing lockout means co-operating with the digit set levers;

FIG. 21a is a cross-sectional view taken along line 21a—21a of FIG. 21;

FIGS. 21b and 21c show in elevation details of mechanisms associated with the sector gears;

FIG. 22 is a vertical view taken along line 22—22 of FIG. 15;

FIG. 22a is a vertical view taken along line 22a—22a of FIG. 22;

FIG. 23 is a vertical view of the carriage mechanism; and

Figure 24:
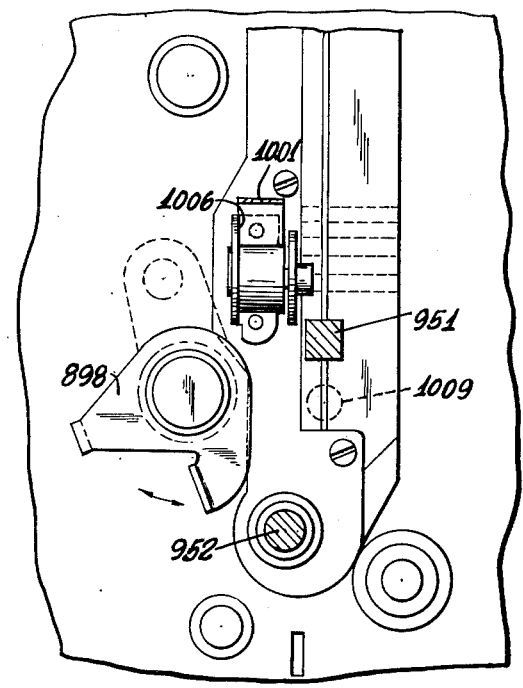

FIG. 24 is a vertical view taken along line 24—24 of FIG. 23.

Figure 1:
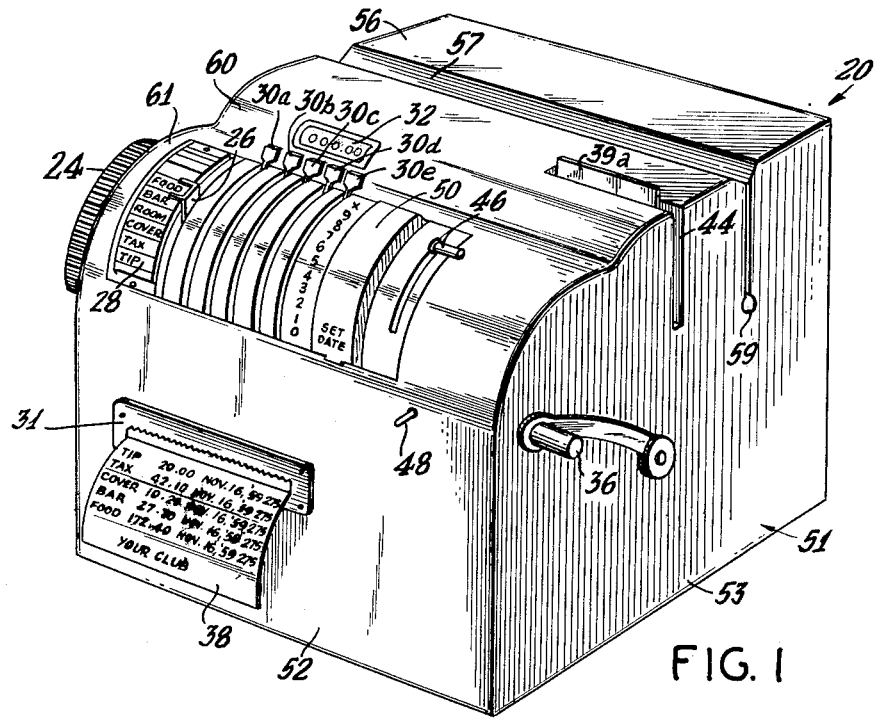
FIGS. 1 and 1a are outside perspective views of the machine embodying the invention.
Figure 1A:
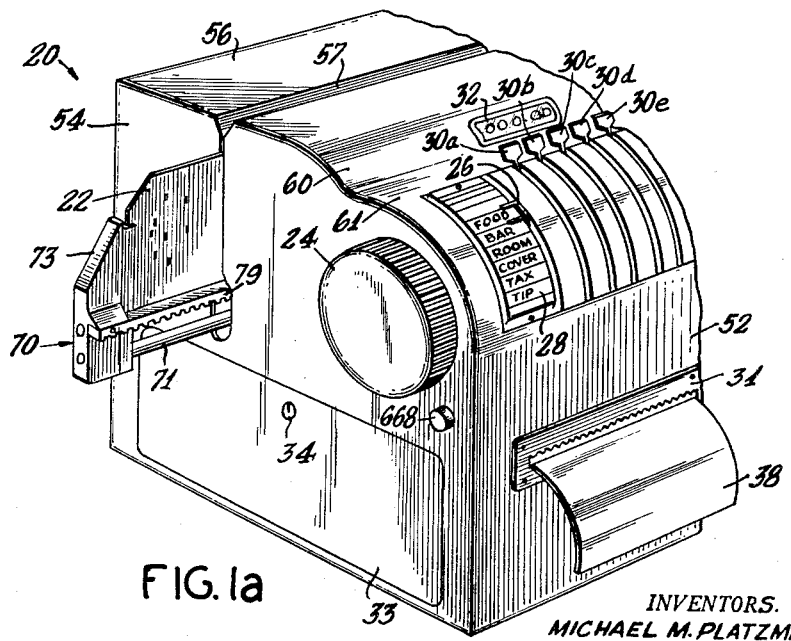

In FIGS. 1 and 1a of the drawing there is shown an apparatus designated generally by the numeral 20, intended for punching a tabulating card so as to record data thereon. The device may be employed for all kinds of charge account and credit systems, production control, inventory control, money order, bank check, and other like record purposes. For purposes of illustration and to facilitate understanding of the apparatus and the advantageous features incorporated therein, the following description of the apparatus as employed for charge account and credit systems is provided by way of illustration. It is to be understood that the apparatus may be employed for other recording purposes.

Let it be assumed that it is desired to record a customer's purchase on a tabulating card and include the following information: (1) a code number identifying a particular establishment or station at which the purchase was made; (2) the customer's identification number; (3) an identifying serial number for each particular transaction made by the establishment; (4) the month, day, and year; and (5) the amount charged in each of a a number of categories. Provision is made for six categories in the illustrated embodiment but this number may be varied.

Figure 1B:
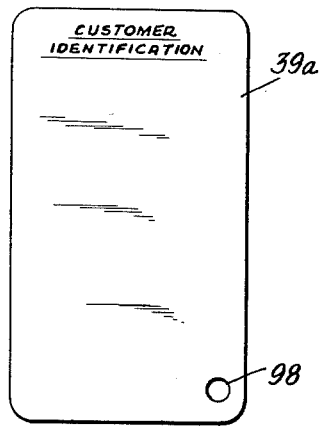
FIGS. 1b and 1c are top plan views of a customer and station identification card, respectively.

The operation is carried out by the operator inserting a tabulating card 22 and a suitably punched customer's identification card 39a, (FIG. 1b) into slot 44 extending into the apparatus. The tabulating card 22 is normally pre-punched with the establishment number by means disclosed more fully hereinafter.

The customer's identification card 39a (shown in FIG. 1b) is locked into position by means of locking lever 46. A mechanism associated with latching lever 46 assures proper alignment of date reproduced into the tabulator card and indexes a serial number advance mechanism so that each customer transaction is assigned a successive serial number. Under cover 50 there is provided means, which will be described more fully hereinafter, for setting the date-printing mechanism to print the proper date on a receipt and punch the tabulator card with the date information.

For a given business or employment of the apparatus there is the likelihood that a particular charge category will occur in the majority of the transactions. Provision is therefore made for recording that particular category simultaneously with the entry of the customer identification information. This record is made on portions of the tabulating card referred to hereinafter as Area II. Other entries will be made as required in other areas of the card offset from Area II. Such areas are delineated in FIGURE 1d.

By recording the most often charged category simultaneously with the customer identification information the number of operations required to complete the transaction is minimized. For example, when employed by a restaurant, charges for food would occur on almost all transactions. For a hotel having an active restaurant, room and food charges are likely to be the most common transactions. Item selector knob 24 may be turned to set indicator 26 to a desired item category and simultaneously set the mechanism to make the desired record. The items listed, by way of example, on index 28 are: food, bar, room, cover, tax, and tip. This represents a typical arrangement for hotel use. In FIGURE 1, the indicator 26 is shown pointing to food. Quick-set levers 30a–30e are employed to set dollar amounts for the particular item category. The amount set by the levers will appear in window 32.

After the operator has selected the charge category and sets the corresponding dollar amounts, by means of quick-set levers 30a–30e, he pulls handle 36 setting in operation the mechanism to perform the following functions:

(A) FIRST OPERATION OF HANDLE (1) Detects holes in the customer's identification card 39a, and punches tabulating card 22 to transfer identifying information.

(2) Punches the transaction serial number and date on Field A in Area II of the tabulating card.

(3) Punches the amount, set by quick-set levers, in Field A of Area III of the tabulating card, if this particular item is selected. If any other item is selected the mechanism will lock on the first operation.

(4) Prints the transaction number and date on a receipt 38 and a duplicate on a detail roll.

(5) Advances the paper supply for receipt and duplicate detail roll.

(B) SUBSEQUENT OPERATIONS OF HANDLE (1) Punches the amount set by levers 30a–30e in the proper field as determined by the item lever.

(2) Prints item and amount on receipt 38 and detail roll 40.

(3) Restores amount levers 30a–30e to the normal zero position.

Figure 1C:
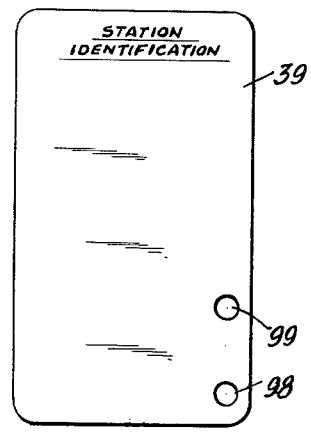

It is conventional practice for credit organizations to issue credit identification cards to their subscribers in the form of a directory book containing a listing of establishments extending credit to its subscribers. The credit organization subscriber or member is referred to as the "customer." One aspect of this information is the provision of a directory book, of the type described, provided with a cover which may serve the additional function of customer identification card 39a. In this arrangement, the cover is formed of a stiff sheet material and is provided with perforations arranged in a pattern corresponding to a code indicative of the subscriber's identification number. Identification card 39a, be it separate or attached to the credit book, is inserted into the slot 44. As will be brought out in greater detail, the card perforations control the punch mechanism so as to punch onto the tabulating card 22 information as to the identity of the card holder and details of the charged purchase. If the apparatus is being used for other purposes such as inventory control, the identification card 39a may serve to identify a particular stock number or particular project against which materials are being charged out of stock. The establishment code number is punched into the card by using the apparatus with the establishment or station identification card 39 (FIG. 1c) inserted in slot 44 in lieu of the customer credit plate 39a. As will be further explained hereinafter, provision is made for locking out the punches which punch data in Areas II, III, IV, and V, and, if desired, the serial number advance when the establishment identification card is employed to prepunch tabulator cards.

The credit granting establishment need only assemble the punched tabulating cards at the end of a given accounting period and forward them to the credit organization who can then process the cards on conventional tabulating machines so as to obtain the total sum due to the restaurant, hotel, or other credit granting establishment, and automatically bill its subscriber, the individual customer. It is readily apparent that the use of the apparatus of this invention eliminates the necessity for the individual establishment to transcribe individual customer checks, or sales slips, and eliminates the need of involved clerical activity by the credit organization.

Referring now, in detail, to FIGURES 1 and 1a, there is shown a machine 20 embodying the invention. The machine includes an outer casing 51 having a front wall 52, side walls 53 and 54, a rear wall 55, and a top flat wall 56. The top wall 56 extends forwardly of the rear wall 55, interconnecting the side walls 53 and 54. A transverse slot 57 extends across the casing 51 and downwardly along side walls 53 and 54. For ease in inserting tabulating card 22, the edge of the slot 57 formed in top wall 56 may be provided divergent edges. The lower end of slot 57 is provided with an enlarged opening 59.

The casing 51 between the front wall 52 and a top wall 56 is formed to two arcuate surfaces 60 and 61 meeting with each other.

Figure 10:
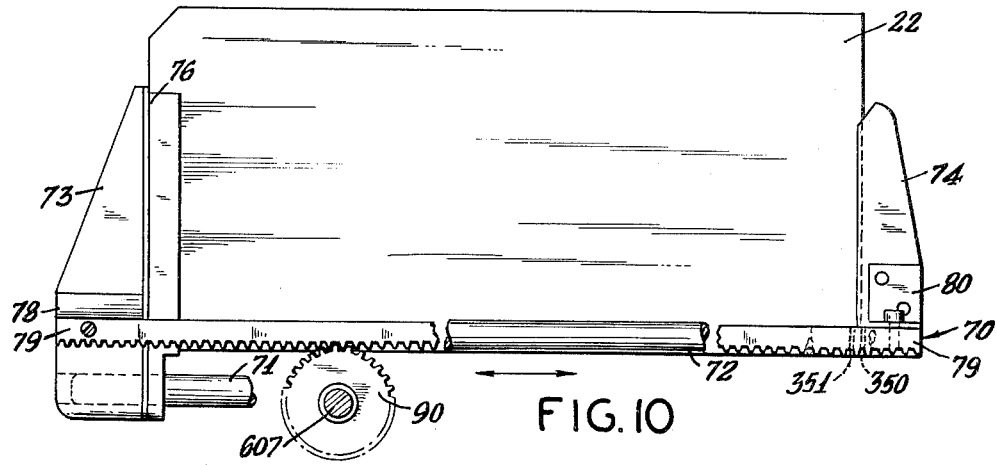
FIG. 10 is a cross-sectional view taken along line 10—10 of FIG. 2.

As shown in greater detail in FIGURE 10, the tab card 22 to be punched is placed in a carriage 70. The card 22 rests on the upper edge of a rod 72. The card is accurately located along the rod 72 by means of end guide members 73 and 74. Members 73 and 74 are provided with slots to receive the card. Member 74 fits into a vertical slot formed in the end of rod 72 and is pinned therein by conventional fastening means; member 73 and member 76 are attached to member 78 by means of screws, not shown. Member 76 is preferably a stainless steel or a cold rolled steel chromium plated member so as to withstand wear. In an alternative embodiment it is contemplated that members 73, 76, and 78 be molded as a one-piece nylon member. Rod 71 fits into a bore in the body of member 74 and is pinned therein. One end of rack member 79 is attached to member 74 by means of a bracket 80. The other end of rack 79 is bolted to member 73. Rack 79 moves the carriage in accordance with the rotation of gear 90 with which the rack 79 is engaged.

The conventional tabulator card is provided with 80 vertical data storage columns arranged across the card, each of the rows includes 10 spaced digital storage areas. In the card shown in FIGURE 1d there has been reserved the 46th and 48th columns for the recording in digital fashion the month in which the transaction has occurred. Thus, if the "zero" space in the 46th column, and the "one" space in the 48th column is punched, this would indicate, in digital fashion, that the transaction occurred during January.

Since a typical tabulator card is provided with 800 discreet information storage areas, it will be appreciated that means have to be provided for either moving the card so that any one of the 800 positions may be located opposite a punch or that the card be fixed in a single position and means provided for moving a punch in juxtaposition with the selected one of the 800 areas. The apparatus of this invention provides a mechanism which provides an optimum balance between the card movement required and the number of punches required to store the data.

The card storage area may be regarded as containing three primary storage areas for the particular application employed for the illustration, however, for convenience, one area shall be regarded as four separate Areas, III, IV, V, and VI.

Figure 1D:
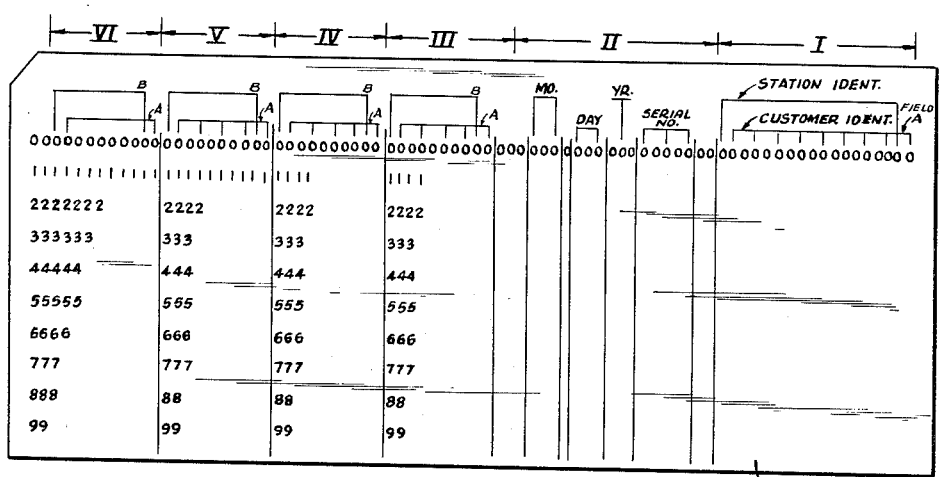
FIG. 1d is a plan view of a tabulating card.

As may be observed by reference to FIGURE 1d, Area I is reserved for the storing of identification derived from identity cards inserted into the machine and is arranged to receive an identification number from each of two cards, each number containing as many as nine digits. This is accomplished with the use of but nine rows of punches in fractional inch movement of the card. A second bank of but eight columns of punches will provide information as to month, day, year, and serial number and punch corresponding portions of Area II. A third bank of punches, involving five columns, will provide a five digit quantity amount and in conjunction with a transport mechanism will position the card respective to the punch set appropriate to the allocated card area for the item being recorded. This last set of punches will be operated in Areas III, IV, V, and VI.

It should be appreciated that while the particular arrangement of punches and number provided has been found most convenient for the conventional hotel or restaurant operation, for inventory control or other purposes it may be desired to record a greater number of digits and this may be accomplished by merely increasing the number of rows available without departing from the spirit of the invention.

Within Areas I, II, III, IV, V, and VI, alternate vertical columns are employed for recording data. Thus, regarding "Field A" as comprising the even numbered vertical columns, "Field B" would comprise the interlaced odd numbered columns. Thus, when the establishment identification data is recorded in Field B of Area I, a shift of but one column is required to record the customer data in Field A of Area I. If the interlaced arrangement were not employed a more extensive movement of card or die would be necessary to locate the card so as to permit the recording of subsequent data on a clear area. Thus there has been provided a machine characterized by simplicity in construction, number of components, and a minimum of mechanical movement.

*Recording of Station Identification*

After the identification card 39 has been inserted into slot 44, the locking lever 46, is moved downwardly to the "read" position, where it is locked in place by means of a latch, the latch being manually released at the end of the transaction. If the card is correctly oriented the "lock in" operation will be permitted to go to completion. However, if the card is not properly oriented, then means come into play to prevent the completion of the locking step.

A pin cage 100 carries a plurality of spring loaded pins 101 for sensing the information and for distinguishing between a station and a customer identification card. The pin cage 100 is shown in elevation in FIGURE 6. The pin arrangement as viewed from the front of the machine, is shown in FIGURE 6a. Sensing is accomplished by moving the pin cage about ¼" toward the card. Only those pins in line with a perforation in the card pass through to a point where they may act as a control, the others are stopped by the card. The movement of the pin cage 100 is controlled by the locking lever 46. As shown in FIGURE 6, as lever 46 is moved downwardly to its "latch in" position, shaft 121 rotates and in turn moves cam 120 which is keyed to it. Cam 120 acts against rotatable bearing stud 108, causing member 110 to move upwardly, pivoting lever arm 106 about tie rod 114 and lever arm 107 about tie rod 113. Members 112a and 112b are moved in parallel causing members 105 and 105a, which are attached to pin cage 100, to slide horizontally on fixed bearing shafts 115, 116, 117, and 118. If the identification card is properly positioned, it is locked in place during the first 20 to 25 degrees of movement of lever 46. This locking action is carried out by pin 103, as well as those of the sensing pins 101 which go through the information perforations present on the card.

The mechanism for determining if the identification card is properly positioned is shown in FIGURE 6b. If the identification card is not properly oriented, then as member 105 advances, pushing forward pin cage 100, pin 103 will be obstructed by the card 39. This will occur in the first 20 or 25 degrees of a total of 60 degrees of movement of locking lever 46. In the event that the pin cage 100 advances and pin member 103 strikes an obstruction, it will cause lever 152 to rotate counter-clockwise about tie rod 113, positioning right angle portion 152a in the path of stud 133. Arm 132, to which stud 133 is attached, is thus prevented from further movement. In turn, further movement of locking lever 46 is prevented by the interaction of the linkage shown in FIGURE 7a.

As lever 46 is moved, cam 130 engages pawl 134. Pawl 134 is pivoted on stud 135 which is carried by lever arm 132. Spring 131 couples pawl 134 to lever 132. If the card is improperly positioned the further movement of lever 46 is arrested by the engagement of stud 133. If the card is properly positioned, then the movement of lever arm 132 lifts bail 144 by means of a linkage, which includes link member 145, which like bail 144 is fixed to shaft 146. Link 147 couples lever arm 132 to link 145.

Referring now to FIGURE 6, it will be noted that cam 120 carries studs 123 and 124. When the locking lever 46 is in any other but the latched position, stud 123 is located in a slot formed in a forked arm 125. Arm 125 is mounted with shaft 121 positioned in the slot formed by the forked portion. In the latched position, stud 123 is clear of arm 125. When operating handle 36 is pulled down, shaft 191 rotates counter-clockwise and it will be observed that lever 126 which is pinned to shaft 191 and is coupled to arm 125 by means of stud 127 will tend to move the arm 125 so that it slides on shaft 121. The importance of this mechanism is that it serves as means for preventing operation without an identity card in place, for, as will be appreciated from consideration of FIGURE 6b, the absence of an identification card will cause lever 152 to intersect stud 133 and prevent operation of the linkage associated with lever 46. It, therefore, follows that the main operating handle 36 cannot be actuated unless an identification card is properly located in the machine.

On the other hand, if the operator has left operating handle 36 in the down position, stud 124 will intersect leg 125a of arm 125 and prevent operation of the locking lever. Further, in order to remove the identification card, since locking lever 46 is to be returned to its "at rest" position, operating handle 36 must be returned to its "at rest" position, otherwise it will interfere and block operation of locking lever 46.

A plurality of levers 161a–161v are movably mounted on shaft 146 so that it serves as a fulcrum for the levers. As bail 144 is rotated clockwise about the axis of shaft 146, tension springs 160 connected between spring anchor bar 164 and respective ones of the levers 161a–161v, urge the levers to follow causing their respective interposers 162a–162v to move upwardly. Pins 101 extend beyond the pin cage a sufficient distance to intercept the interposers. Any pin 101 passing through as perforation in the card will intercept the particular interposer in the same vertical plane. The presence of a perforation in the identification card thus serves to locate the position of a hardened steel anvil 163 attached to each interposer 162. The position of each of the anvils determines the punches selectively actuated to punch the tabulator card. Stud 165 serves as a guide. Each interposer is provided with a slot to receive a roller 167.

One feature of this invention is the simplified punch and die arrangement. The die 169 consists of a plurality of identical plates 170 each having parallel grooves milled into one face adapted to receive a punch 171. The plates are assembled with appropriate spacers 172 and bolted together into a unitary assembly provided with a slot to receive a tabulator card and the tabulator card carriage 70.

Referring now to FIG. 8, there is shown the operating handle 36 connected to main shaft 191. Bell crank 192 pinned to shaft 191 is coupled by stud 195, link 196, stud 197, and punching lever 198 to shaft 199.

Rotation of shaft 199, rotates bell cranks 207 and 208 which are coupled together by link 209. The motion is then transmitted to the die set 169 through plates 210. Accordingly, it will be appreciated that pulling down of operating handle 36 will cause the die 169 to move to the left carrying along the hardened steel punches 171.

If an anvil attached to an interposer is positioned in line with a particular punch, that punch will be driven through the tabulator card to provide a perforation representing in digital fashion the bit of information transferred from the identification card. Fixed position bars 176 serve as "knock-out" means to clear the punches 171 from the tabulator card when upon release of the operating handle the die set 169 is returned to its "rest" position. Bars 177 move with the die set and realign the punches so that they clear the tabulator card and interposer anvils.

The apparatus is designed to simultaneously punch into the tabulator card, the serial number and date of the transaction and the customer identification data. In order to suppress and prevent punch selection for date and serial number when the establishment or station identification card 39 is employed, the latter is provided with a special sensing hole 99, shown in FIGURE 1c.

The special sensing hole 99 receives pin 102 when cage 100 is moved. The advance of pin 102 permits the operating of the cascaded linkage comprising lever crank 180, link 181, lever 182, link 183, lever 184, shaft 185 and vane 186, to move vane 186, so that it engages the particular interposers selecting the date and serial number punches.

Since Field B has been arbitrarily assigned to the recording of the station identification data, means are provided for automatically moving the carriage by one column to Field B if the device is set for recording on Field A.

Figure 3:
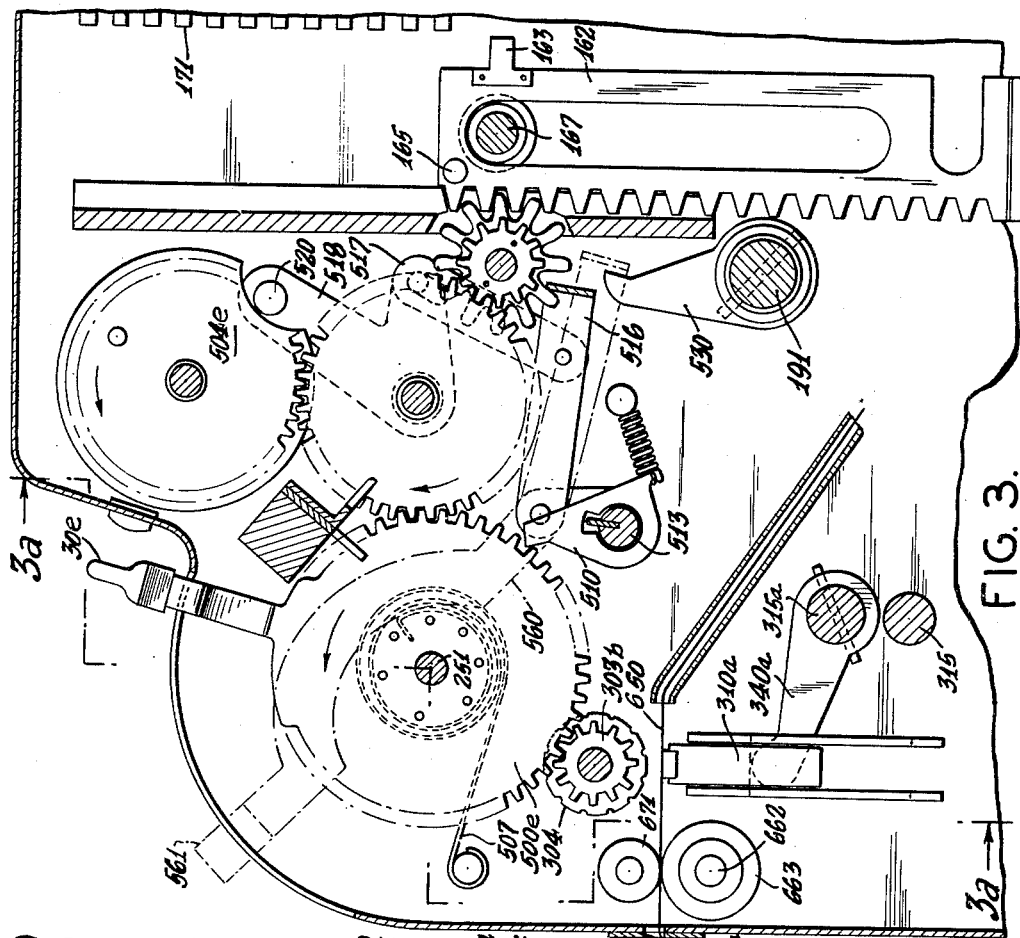
FIG. 3 is a cross-sectional view taken along line 3—3 of FIG. 2.
Figure 3A:
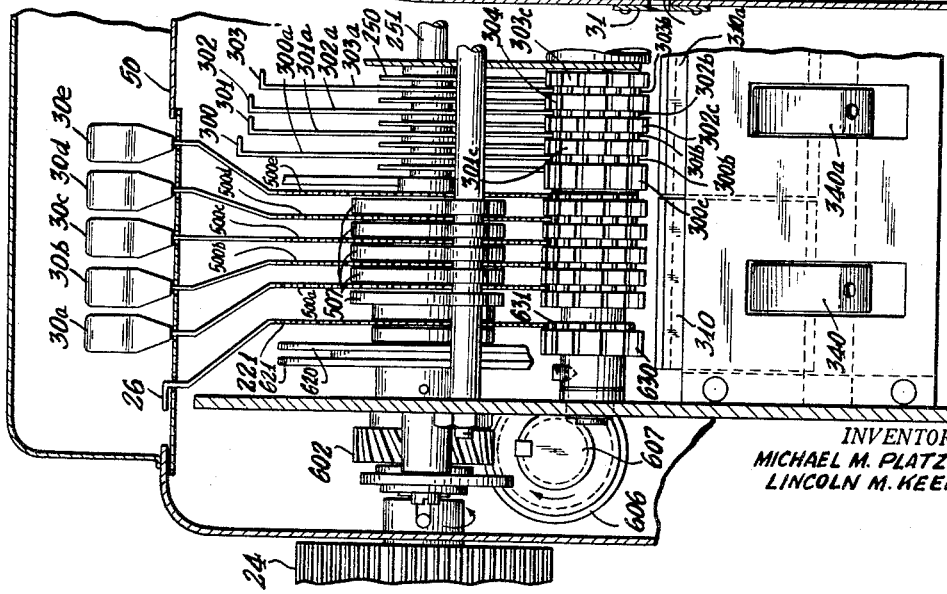
FIG. 3a is a cross-sectional view taken along line 3a—3a of FIG. 3.

In part, the carriage shifting means linkage is shown in FIGURES 3a and 3c.

The rotation of shaft 185 in locking actuates lever arm 187, thus moving link 188 and rocking lever 189. Lever 189 engages pin 221 attached to item gear 220, in turn causing gear 222 to rotate. Gear 222 is pinned to shaft 601 which rotates gears 602, 606, shaft 607, gear 90, and rack 79, thereby moving the card carriage 70 a distance of one column. The shaft 607 and carriage 70 are shown in FIGURES 9 and 10.

Having thus completed the operation of recording the station identification data on the tabulating card (or cards), the station identification card is removed.

When a customer presents his identification card, or a workman's card, or stock card, that card and a tabulator card is placed in the machine. The customer's identification card 39a differs from the station identification card only in the omission of sensing hole 99 positioned to receive pin 102. Thus the use of the customer identification card does not lock out the punching of date and serial number.

The locking lever 46 is pulled down and latched to lock the identification card into place.

The item selector knob 24 is turned to move the indicator 26 opposite the first item. The quick-set levers 30a–30c are then adjusted so as to bring the desired dollar amount into view in window 32.

The operating handle 36 is then moved down and released so that it returns to its "rest" position.

This operation will punch the customer number, serial number, date and amount of the first item in Field A of the card.

It will be noted that the item 1 quantity will be recorded in Field A of Area III.

The operating handle 36 is linked to a printing mechanism which simultaneously prints the serial number, date and item amount data on a tear-off slip and a duplicate on a roll of paper.

The customer number is not printed onto the receipt or duplicate as associated printing means are not provided. Such printing means may readily be incorporated.

Referring to FIGURE 2, there is shown a plurality of columns of punches 171 identified by letters a to v.

Punches a to i are employed to perforate the tabulator card with the identification data.

The punches of columns j, k and l serve to record a serial number of not more than three digits.

The punches of column m record the last digit of the year.

Date and month data are recorded in the tabulator card by columns n and o and p and q, respectively.

The punches of columns r to v inclusive, record the amount charged to each of the items.

In all instances the punches are controlled by the position of the respective column interposer anvils 163a–163v.

Whereas the interposers of columns a to i are controlled by the pins of pin cage 100, the other groups of interposers are set differently.

Figure 7:
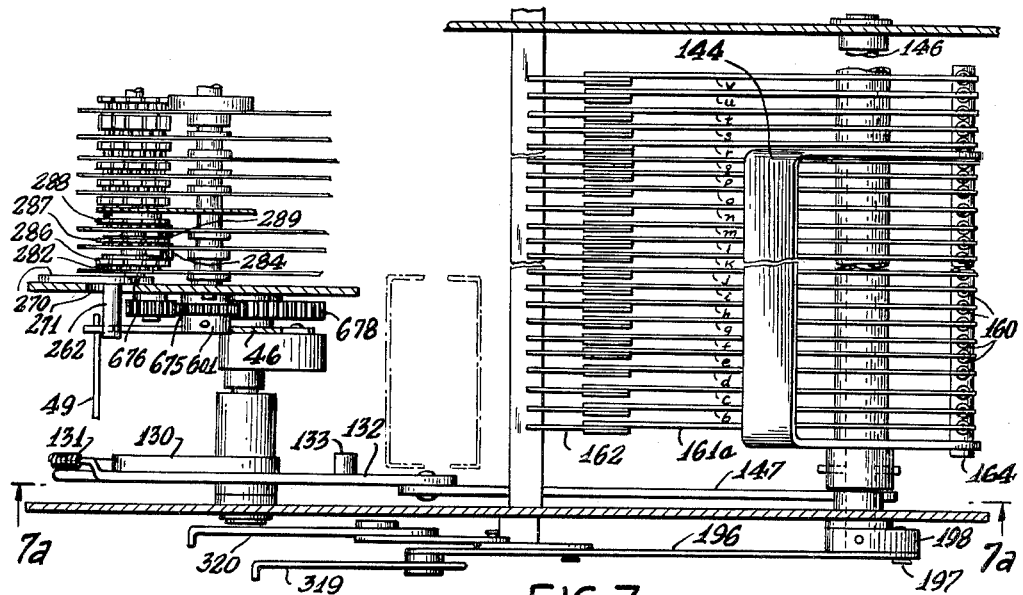
FIG. 7 is a top cross-sectional view illustrating the mechanism for controlling the punching of the identification numbers.

The printing and punching of the serial number is controlled by the mechanism shown in FIGURE 7.

As locking lever 46 is pulled down the linkage members 132, 147, 145, and bail 144 cooperate to raise the interposers 162a–162v until they are intercepted.

The upward movement of interposers 162j, 162k, and 162L causes sector arms 250j, 250k, and 250L to move upwardly, pivoting about shaft 251, to the position shown in phantom in FIG. 5.

The sector arms carry studs 254j, 254k, and 254L. Studs 254j, 254k, and 254L engage cams 256j, 256k, and 256L, respectively, to limit the motion of the sector arms and thereby limit the motion of the respective interposers. The cams 256j, 256k, and 256L are set by attached gears 258j, 258k, and 258L, which are meshed with gears 260j, 260k, and 260L.

Referring to FIGURE 7b, there is shown locking lever 46 which is pivoted on shaft 121. Each time the locking lever is lowered for locking of an identification card the serial number is advanced by the release of pin 262 which causes pawl 270 to move ratchet gear 266 one tooth.

With the first ten degrees of movement of lever 46, spring 268 "rolls" pawl 270 and ratchet wheel 266 in a "toggle-like" movement. This causes the first digit print wheel 286 to advance and position the next digit in the printing position. Stud 262 contacts the edge of a clearance hole 271 (see FIGURE 6) at approximately the "seven o'clock" position to limit action and index the print wheel.

As pin 262 is moved downwardly, pawl 270 moves stud 272 and holding pawl 274 to which the stud is attached. Holding pawl 274 is biased by spring 276 to engage gear 260. Pawl 270 pushes back against stud 272 and jams the ratchet tooth preventing overthrow.

Referring now to FIGURE 7, as the ratchet gear 266 rotates, it rotates gear 282 meshed with floating gear 260. The first digit print wheel 286 is coupled to the tens print wheel 287 through transfer gear 284. In turn the hundreds print wheel 288 is coupled to the tens print wheel through transfer gear 289.

In FIGURE 3a there is shown month, day, and year setting levers. Lever 300 sets the month, levers 301 and 302 set the date, lever 303 sets the last digit of the year. Since the decade need be set only once in a decade a stylus is used for this setting. From the side view of FIGURE 4 it will be seen that the levers are affixed to floating gears 300a, 301a, 302a, 303a, respectively. These gears are meshed with gears 300b, 301b, 302b, 303b. Associated with each of the gears there is provided a print wheel 300c, 301c, 302c, 303c. As viewed from the top view of FIGURE 3a, the print wheel 300c, 301c, 302c, is affixed to the gear immediately to its right. Gear 303b is affixed to the left side of print wheel 303c. Print wheel 304 prints the decade of the year. This print wheel is set by a stylus once in a decade and is provided with a simple spring loaded detent to prevent it from unintentional movement. The decade for the year is not punched into the tabulator card.

Referring now to FIGURE 4, there is shown the floating gear 303a and a spring loaded ball detent 305 for maintaining the gear in a pre-set position. Each of the loading gears 301a to 303a is similarly locked in place.

In engagement with each of the floating gears there is provided a gear 306. In gear 306 there is provided a cam 308. As a date control gears 300b to 303b is changed and associated cam 308 is rotated. Then, as the associated sector arm 250 moves upwardly its respective stud 254 will be intercepted by the cam 308, preventing further movement and thereby determining the position of the associated anvil 163 which determines the punching of the tabulator card. A complication arises in the printing of the month. The type wheel 300c for printing the month carries abbreviations for the 12 months about the periphery of one wheel. It is desirable to provide a punched record card which may be employed with tabulating devices limited to printing in a decimal system. Therefore, the card is punched in two columns to indicate the month. The punch in any one of rows 1 to 9 of one column would indicate the months of January to September, respectively. A punch in row 1 of the second column and the 0 (zero) row of the first column would indicate October. If row 1 of the second column and row 1 or 2 of the first column were punched, this would indicate November or December, respectively. This relationship is shown in the following table.

| Print wheel | Card Row | Punches Column 2 | 1 |
|---|---|---|---|
| Jan. | 1 | | X |
| Feb. | 2 | | X |
| Mar. | 3 | | X |
| Apr. | 4 | | X |
| May | 5 | | X |
| Jun. | 6 | | X |
| Jul. | 7 | | X |
| Aug. | 8 | | X |
| Sep. | 9 | | X |
| Oct. | 0 | | X |
| Nov. | 1 | X | |
| | 1 | | X |
| Dec. | 1 | X | |
| | 2 | | X |

Figure 11:
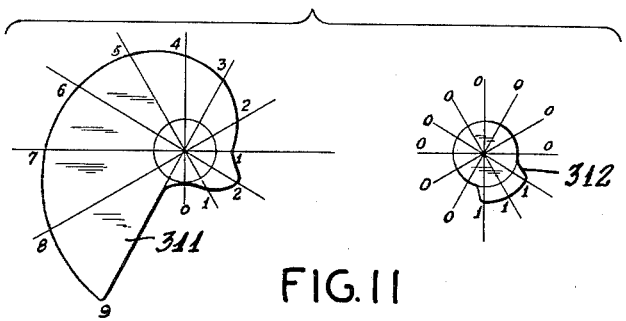
FIG. 11 is a layout of cams employed for setting the month punching means.

Accordingly, there is employed a pair of cams 311 and 312 (shown in FIGURE 11). The cams are fixed for rotation together as the month is set by movement of gear 300a. As the wheel is moved the cams are rotated. Cam 311 serves as a unit cam and has 12 positions, each position corresponding to a different month. Cam 312 serves as a tens cam, likewise having 12 positions. Each of the cams controls a different interposer for controlling the punches for punching numbers to indicate any one of the 12 months, as indicated above. In FIGURE 11 the numeral associated with the respective month position indicates the digit which will be punched by the associated punch.

The mechanism for selecting the item and amount is shown in detail in FIGURES 3, 3a, and 3b. The amount of the item set on the keyboard is visually indicated in window 32 by means of wheels 504a–504e, which are provided with digital characters on their face. These wheels are geared to quick-set levers 30a–30e. In FIGURE 3 the levers 30a–30e are shown in the blank position, as the levers are moved downwardly they move through "dash," 9, 8, 7, 6, 5, 4, 3, 2, 1, and zero positions.

Upon operating the operating handle 36 to punch the amount in any field, the amount levers are automatically moved back to the blank position, when pawls 510 are released near the end of the return stroke.

The moving of any one of the five quick-set levers 30a–30e to select an amount from "0" to "9," will rotate member 500 and move lever 518 by pushing stud rod 520 out of a detent depression in 504a–504e, thus causing pull link 516 to drop onto claw 530. As operating handle 36 is pulled down to punch and print, the amount link 516 drops further into a pick-up position. As operating handle 36 is pushed up and back to the "at rest" position, near the end of the back stroke, claw 530 picks up link 516, rocking shaft 513 and thereby releasing all pawls 510. In turn set-up gears 500 are released and each are pulled back to the "blank" position by its "clocktype"

spring 507. When *all* five are back to the "blank" position, spring 519 pulls back levers 518, thereby disengaging link 516 from claw 530, so as to permit pawls 510 to engage the teeth of sector gears 500. Links 517 couple members 516 and 518 to each other. In addition to the automatic release means, a push-button 561 is linked to member 516 by arm 560 and permits quick manual erase of the amount set in the event of an error in setting.

It was earlier pointed out that carriage 70 is moved by the rotation of gear 90 which is in engagement with rack 79. Gear 90 is keyed to one end of shaft 607 which is supported by bearing members 598 and 599. Keyed to the other end of shaft 607 there is provided a helical gear 606 which is in meshing engagement with gear 602. Gear 602 is keyed to shaft 601 which is coupled to selector wheel 24. It will be appreciated that as selector wheel 24 is rotated, carriage 70 will be forced to move so as to position tabulator card 22 in the proper operating relationship to the punches. The carriage is provided with means (shown in FIGURES 9 and 9a) to move it a distance corresponding to the separation between adjacent vertical rows of the tabulating card. This, as has been pointed out earlier, provides a shift from Field A to Field B. In FIGURE 9a there is shown a detent wheel provided with 8 grooves arranged in 4 sets of two, each set being spaced at 90 degree intervals about the periphery of the detent wheel 651. Wheel 651 is keyed to shaft 607. The detent employed is a rod 652, which is depressed by piston 653 under the constant pressure exerted by spring 654, screw 655 provides means for adjusting the spring pressure.

The detent provides positive location for Fields A and B, as well as to locate the card properly opposite the amount punches R, S, T, U, and V for recording in the proper area. It will be noted that the detent wheel is provided with 4 sets of detents, one set serving for recording simultaneously in Areas I, II, and III.

To insure proper recording in the desired A or B Field, the pivoted detent rod 652 is coupled by means of linkage 656 to pivoted arm 657. When rod 652 is out of a detent position, arm 657 engages stop 658, which is part of lever 659. Lever 659 being pinned to main operating shaft 191 prevents its movement. In the detent position pivoted arm 657 is clear of stop 658, permitting shaft 191 to be turned.

Synchronization of the print wheel 630 for printing the selected item is provided by a mechanism shown in FIGURE 3d. As the item selector knob 24 is rotated to move the carriage, shaft 601 rotates thereby causing gear 620 and Geneva gear 621 to rotate. Gears 620 and 621 are both pinned to shaft 601 and engage mutilated gear 622. Gear 620 is provided with a cut-out at 90 degree intervals so as to provide two half teeth at each point. In FIGURE 3d a portion of gear 620 has been shown broken away to expose a typical two-tooth segment of gear 621. It will be noted that the valleys of the teeth of gears 620 and 621 coincide. Gear 622 is a mutilated gear having every other tooth removed in the region coinciding with gear 620. This serves as a means for maintaining the teeth of gear 622 properly orientated after each time gear 622 is engaged by gear 621. For a 90 degree rotation of gear 621, the 8 tooth gear 622 will make a quarter revolution. Gear 222, coupled to gear 622, will move sector gear 220 a distance corresponding to two teeth and move indicator 26 to the corresponding indication, and simultaneously set item print wheel 630, which is coupled by gear 631 to gear 220. Since each item has been assigned a particular position on the card it is not necessary to punch the card to show the particular item. It will be recalled that the amounts for a given item are recorded first in Field A of Area III, then in Field B of Area III, requiring a carriage shift of one column and then a carriage shift of nine columns. The third item amount is recorded in Field A requiring a carriage shift of one column, a subsequent shift of nine columns for the next item, and so on. Thus, with the forty tooth equivalent gear 621 after a rotation of 81 degrees gear 622 advances one tooth, moving the pointer to the next item and print wheel 630 coupled to gear 220 by an eight tooth gear will likewise be moved to locate the proper item in position for printing.

A feature of this invention is the means for insuring that the identification be punched in the proper portion of the tabulator card. There has been provided a pair of slots 350 and 351 formed in bar 72 of carriage 70. Pivoted on member 169 by means of pin 353, there is provided a knife blade 352. Spring 354 normally maintains the knife blade out of engagement with slots 350 and 351. There is provided an arm 356 pinned to shaft 146. When baling shaft 146 is actuated through linkage 145 and 147, arm 356 rotates, engages lever 358, which moves upwardly forcing knife blade 352 into slot 350 or 351, thereby locking the carriage in the A or B Field position. In the B Field position, the carriage will remain locked until locking lever 46 is released for removal of the station identification card 39. This permits any number of cards to be punched with the station identification.

On the other hand, if the carriage has been locked in the A position, then only the first item amount can be punched. Any other item amount would be blocked. However, upon the first operation of the operating handle 36, shaft 191 would rotate counter-clockwise causing lever 358 to move, moving linkage 360 so as to rotate member 362 about shaft 315. Pawl 364 coupled by means of spring 366 to member 362 is triggered and released from the position shown in phantom. In turn pawl 364 engages the tail end of pawl 134 which is at this time in the position shown in phantom. Pawl 134 is triggered so as to slip by cam 130. The weight of the various interposers and associated levers then clears the set-up for punching the date and serial number. At this stage the mechanism is cleared so that any item can now be punched and at the same time stop member 356 is moved clear of the end of knife 352, thereby unlocking the carriage.

As a safety device to insure that the customer identification number is recorded in the proper area, means are provided to move carriage 70 to the Field A position every time either the customer identification card 39a, or establishment or station identification card 39 is released by unlocking of the locking lever 46, so that it is returned to the "rest" position by spring loaded means.

Carriage 70 is moved to Field A position by the action of gear 675, which is keyed to shaft 601 at the other end thereof, with relation to wheel 24, so that as wheel 24 is rotated, gear 675 likewise rotates. The location of gear 675 is shown in FIGURES 2 and 6 of the drawing. Gear 675 engages idler gear 676, which in turn engages sector gear 678.

Sector gear 678 is mounted in a floating relationship with shaft 121. As locking lever 46 is depressed stud 679, extending from the locking lever, is moved in a counterclockwise direction away from floating gear 678. It will be recalled that the customer identification number, serial number, date, and the first item are recorded on the tabulator card 22 with the carriage in the extreme left position, and that as additional item entries are made the carriage progresses to the right, that is to say, inwardly. In so doing, rotation of shaft 601 causes gear 675 to drive sector gear 678, through idler gear 676, in a counter-clockwise direction. When the transaction has been completed and the operator removes the identification card from the machine, he raises operating lever 46 by releasing the spring loaded latch 49. Spring 47, attached to arm 466, returns lever 46 to its "at rest" position. However, if sector gear 678 is not in the extreme clockwise position, stud 679 will engage sector gear 678. The spring provided is intentionally designed so as not to be powerful enough to force the sector gear 678 upwardly against the load of the carriage 70 geared to the sector gear 678, through the linkage recited earlier. Therefore, the operator manually assists in returning the carriage by pushing upwardly on lever 46. If a more powerful spring is employed it necessitates extra effort by the operator to move the lever 46 to the locked position.

The operator can return the carriage to the proper starting position by manually operating selector knob 24.

Movement of the carriage beyond predetermined limits is prevented by the engagement of members 76 and 74 against die set 169.

The various print wheels are arranged so that the type desired to be printed faces downwardly as shown in FIGURES 3 and 3a.

The printing is done on 2 sheets, one of which rolls up inside the machine, and the other of which passes through an opening in the case so that pieces thereof may be torn off against a serrated guide 31. The two sheets may be chemically treated so as to transfer printing through one sheet to the other. Such papers are conventional and are widely used.

Printing is accomplished when main operating handle 36 is pulled downwardly so as to rotate main operating shaft 191.

As main operating shaft 191 is rotated counter-clockwise, crank 192 is rotated moving clevis pin 321 and a pair of kicker members 319 and 320. The kickers are supported in slots formed in member 322 to maintain them in alignment. As the kickers 319 and 320 move to the left they engage levers 317 or 317a, depending on which of the kickers are in the operating position, as will be explained hereinafter. Assuming that kicker 320 is in the operating position, then as lever 317a is engaged it rotates in a counter-clockwise direction likewise rotating shaft 315a in a counter-clockwise direction, causing the tail end of 317a to engage kicker 320, lifting it out of engagement with the head end of member 317a. The free end of kicker 320 thereby clears the head end of lever 317a. At that point spring 318a, which is acting in tension against the tail end of member 317a, is permitted to freely pull the lever clockwise until it is stopped against shock stud 330a. Shock stud 330a is supported by bracket 333 and is provided with a spring 331 under the head of the shock stud. The nuts 334 and 335 are used to adjust the "rest" position of lever 317. In the drawing adjusting nuts 334 and 335 are part of the stop assembly 330 employed as a stop for lever 317. Similar arrangements are employed for stop member 330a. It will be appreciated that the "rest" positions of levers 317 and 317a govern the "rest" positions of hammers 310 and 310a. As lever 317 moves clockwise, shaft 315 rotates clockwise, moving with it throw lever 340 in a clockwise direction. Print hammer 310 is resting on throw lever 340 and is pushed upwardly as the lever rotates. As the motion of lever 317 is arrested by the shock stud 330, the momentum imparted to hammer 310 permits it to move without restraint in guide 313 until it forces paper 650 up against the print wheels. This results in the printing of the item and amount number. In like fashion kicker 319 actuates hammer 310a to print the date and serial number.

In FIGURE 8 there is shown a linkage coupled to bail shaft 146. As the operating handle is operated for the first punching operation, whereby the customer's identification number, transaction serial number, and date are recorded, the bail shaft 146 is rotated clockwise. This causes lever 329 to rotate clockwise moving linkage 328 in a downward direction. Link 328 couples lever 329 to T lever 327 by means of studs 328a. On the first operation of the operating handle, lever 323 moves upwardly thereby causing studs 325a to engage and raise kicker 320. Upon the return of the operating handle to its rest position, T lever 327 rotates counter-clockwise lowering lever 323 while lever 324 moves upwardly permitting stud 325b to lift kicker 319. Thus, at all times either kicker 319 or 320 is out of operating position.

Each time operating handle 36 is actuated the rotation of shaft 191 rotates lever 659, causing linkage 660 to move, engaging ratchet 661, rotating shaft 662 and roller 663 mounted thereon. Paper 650 is pressed against idler roller 671 advancing the paper from supply roll 664. Helical wire spring belt 665 couples shaft 662 to rotatably mounted shaft 666 upon which is wound the duplicate record 667. Shaft 666 is slotted to facilitate insertion of the lead end of the paper. The end of shaft 662 extends out of the casing and has affixed to it a knob 668 which serves as a winding knob for manually advancing the paper supply. The paper supply spool 664 is inserted into the machine through door 33 and is mounted on fixed shaft 692. The paper roll is locked in place by means of screw member 693, having a flanged end to retain the spool of paper on shaft 692. The end of the paper is then pushed through a flat tubular guide 670. Both plies of the paper are fed between rollers 663 and 671, one ply 650a is permitted to come out of the front of the machine, the other paper ply 650b is inserted in the slot in shaft 666. Knob 668 facilitates advancing the paper. After each operation the extended portion 650a is torn off as a receipt for the customer. At the completion of the day's operation, or at other convenient time, door 33 may be opened and the accumulated duplicate roll 450b may be removed. It will be noted that door 33 is provided with a lock 34.

Referring now to FIGURES 13, 13a, and 13b, there is disclosed an alternative arrangement for operating the device which eliminates the necessity for a separate operation to lock the identification card into place through the use of locking lever 46. In the alternate operation member 192 is replaced with a sector gear 805 which is pinned to main operating shaft 191. The crank handle 36a is attached to the main operating shaft by pin 802 which fits into a bore in shaft 191. A quarter-inch diameter hardened pin 807, on the hub of crank handle 36a, is fitted into a quarter-inch mating hole in Geneva sector 808 which floats on the main operating shaft 191. Gear sector 806 riveted to Geneva sector 808 is also free to rotate on main shaft 191. Geneva sector 808 cooperates with a disc 810.

Two one-inch diameter spur gears, 812 and 814, and disc 810 are riveted together into a common assembly. As shown in FIG. 13b the total movement of the crank handle is through an arc of 120°. For the first 60 degrees Geneva sector 808 swings cam follower lever 816 upwardly. Pitman link 818 is pivoted to cam follower lever 816 on stud 820. This action rotates lever 822, which rocks shaft 121, in the same manner as did locking lever 46 in the previous embodiment. All the linkages associated with shaft 121 operate in exactly the same fashion.

As operating handle 36a is moved through the first 60 degrees of rotation, the end of member 808 is halfway through an arm on member 810, and the first tooth of sector 806 engages the large inserted tooth 830 in gear 814. Thereafter, for the next 60 degrees of rotation of the operating handle 36a, gear 814 is rotated. In turn gear 812 rotates, rotating sector gear 805, which being pinned to main operating shaft 191 causes it to rotate, carrying out the same operations performed in the other embodiment during the first 60 degrees of movement of the main operating handle 36.

The customer identification card may remain locked in place during one transaction where one or more items are to be recorded for the transaction. As the operating handle moves through the initial 60 degrees of arc it will be blocked from further downward movement if the identification card is not in the correct position. During the first 60 degrees of arc, the identification card lock-in operation is completed, the selection of punches is completed during the last 60 degrees of operation. If the card has been properly positioned, the punching and printing operation is carried out. The operator then raises the handle to the 60 degree position and if there are additional items to be punched, sets the selector knob for a succeeding item and moves the operating handle between the 60 degree and 120 degree position. When the handle is returned to the 0 degree position, the identification card may be removed.

If the operator returns the card carriage to Field A before releasing the identification card, then the return spring 47 is adequate to have roller 840 follow cam 808 and reset shaft 121. If the card carriage 70 is not positioned with Field A in punching position, then lever 842 will shift lever 822 resetting shaft 121 and release the identification card.

While there has been disclosed a manually actuated machine, it is to be understood that a hydraulic piston, electric motor solenoid, or other mechanical actuating means may be coupled to the mechanism to mechanically actuate the device.

*Duplicate Record Tabulator Card Machine*

With the extended use of automated office machines a new form of bill has come into widespread use. The seller presents the customer with a card 847 substantially as shown in FIG. 14. Section 850 is usually kept by the customer for his records and the other portion 851 is returned with the payment. A modification of the apparatus shown in FIGS. 1–13 is shown in FIGS. 15–26 which is particularly adapted for the processing of cards of this type.

This embodiment provides for the punching of a two section tabulator card where it is desired to record and imprint the identical information on both sections of the card. For this application it is contemplated that the use of identification cards may be dispensed with. In operation, a tabulator card 847 is inserted in the carriage 862, the amount to be recorded on the card is set on the machine by means of levers 920–920d. The operating handle 855 is then moved from its rest position downwardly. As the operating handle 855 begins its travel, at a predetermined point, sensing means determine whether or not the tabulator card is properly located; if so, the card is locked into the carriage and the preset amount is recorded on the card by both perforating and printing means. As part of the downward stroke a mechanism associated with the handle locks the preset amount setting. On the upward or return stroke the carriage is moved automatically so as to position the second portion of the tabulator card in operative relationship with the punching and printing mechanism. On a succeeding downward stroke of the operating handle, the second section of the tabulating card is punched and printed. Upon completion of the printing operation the handle is returned to its rest position; the carriage is then manually returned to its rest position, at which time the mechanism clears the preset amount and card locking means, permitting the removal of the punched card and leaving the machine in condition to receive a fresh card.

The operation of the machine having thus been described in general terms, a more complete description of the machine is provided hereinafter.

Referring now to FIG. 15, there is indicated the device referred to generally by the numeral 860. A conventional sheet metal housing 861 is shown with a portion cut away to reveal the internal components.

The operator initiates the operation by grasping tabulator card 847 near its top left end with the thumb and two fingers of his left hand. He then inserts the card into carriage 862 so that the left bottom corner of the card slides down surface 863a of guide 863 and is secured by loop 863b. As the right end of the card is lowered, it enters the slot 864 in punch unit 865; the punch unit has been described earlier in detail (in connection with the embodiment of the invention shown in FIGS. 1–13). As may be seen by reference to FIG. 14, two pre-punched holes 866a, 866b are provided in card member 851. Referring now to FIGS. 16 and 17, lever 866 is mounted on shaft 867 and is permitted to rotate freely thereon. Axially movement of lever 866 is prevented by lever 876 on the inner side and snap ring 869 on the outer side. Riveted onto lever 866 are three pins, 870, 871 and 872. Pin 871 enters the recess in the hub of operating handle 855, thus permitting the operating power to be transmitted from handle 855 to pin 871 and in turn to lever 866.

As handle is rotated through its first 15° of rotation, pin 872 raises cam lever 874, which in turn is secured to shaft 875. This motion rocks shaft 875, a few degrees, in a clockwise direction. After pin 870 has passed through a lost motion space, further movement of operating handle 855 causes pin 870 to pick up lever 876. Since lever 876 is secured to main shaft 867, this movement will rock shaft 867 counterclockwise approximately 20° to effect punching and printing, as will be described later. Referring now to FIG. 18, which shows the opposite end of shaft 875; as shaft 875 is rocked counterclockwise (as viewed in FIG. 18), lever 880 which is pinned to shaft 875 pushes link member 881 to the right. The movement of link 881 tensions spring 882 against stud 884 causing lever 883 on which stud 884 is mounted to rock shaft 885. Arms 886 pinned to shaft 885 carry a rod 887; rod 887 moves in a counterclockwise arc pushing platen 890 in a counterclockwise direction toward card 849, which is at rest between members 863 and platen 890. If the pre-punched holes 866a, 866b in the card are indexed with holes 862a, 862b in member 863, then link 881 will have advanced sufficiently to clear latching bar 888. (As shown in FIG. 22, latching bar 888 is urged against member 881 by spring 889.) Latching bar 888 will latch member 881 and, in turn, lock members 883, 886 and 890 against movement.

During this operation stud 893 on member 883 will have pulled lever 892 and lever 891 to the right; lever 895 will have pulled down locking pawl 896 from in front of stop 897, which is affixed to lever 898. Lever 898 being pinned to main operating shaft 867 will prevent operation of the main operating shaft unless member 897 is cleared. Thus, if the card is not properly oriented so as to permit pins 900 to enter the sensing holes, then further operation of the operating handle and the main operating shaft 867 will be prevented. Spring 894 connected between tab 892a and stud 893 is merely a safety yield connection.

It should be noted that spring 882 should be strong enough to perform as outlined above, but not sufficiently stiff to cause pins 900 to pierce the card if the pre-punched cards are not present or if the card is incorrectly positioned whereby the holes in the card will fail to match the holes in the guide member 863, in which case, if pins 900 meet resistance, then member 890 will not close. As a result spring 882 will stretch and member 896 will remain in position to prevent rotation of the main operating shaft which, as will be explained more fully hereinafter, will prevent printing and punching of the card.

Referring now to FIGS. 21 and 21a, before the card is locked into position the operator sets the amount to be recorded by setting of knobs 919a–919e attached to "quick set" levers 920a–920e. Each of the levers extends from a sector gear 922 which in turn is arranged to mesh with the rack 924 (as shown in FIG. 19). Rack 924 moves interposer member 925 so that the anvil 927 is positioned in line with one of the punch bars 171. The action of the punch bars has been described fully earlier. As member 924 moves, belt 928 carries indicia so that the operator may view the setting through window 932.

As interposer member 925 moves, linkage 934 pivots about shaft 935, lifting rack member 936. Rack 936 engages idler gear 937, which is coupled to print wheel 938 through mating gear 939, thus positioning the desired digit opposite ribbon 940c. It will be noted that at rest ribbon 940c is maintained in spaced relationship to the print wheel.

Referring now to FIG. 22, there is shown a rear view of the carriage mechanism. With the card properly positioned in the carriage 862 the lower edge of the card rests on bar 951. Platen 890 has been moved forward to clamp the card against member 863. Bar 952 slides inside of supporting tube 953.

As the carriage slides to the left, tab 954 picks up pawl 955, which unlocks the set-up and escapes when the card holder is pulled back at the end of the operation. As may be appreciated by referring to FIG. 22, in conjunction with FIG. 22a, pawl 955 is pivoted from member 958.

Assuming that the card is properly located, as the operating handle moves downwardly main operating shaft 867 rotates counterclockwise, as viewed in FIG. 19, causing crank lever 90 to push up link 971. Link 971 is coupled to crank lever 972. Therefore, as main shaft 867 is rotated, crank lever 972 rotates in synchronism causing crank lever 973, to which it is coupled by means of shaft 974, to advance. The action of bell cranks 970 and 972 causes die set 910 to pivot about shaft 980 forcing punches 171, which are opposite the interposer 925, to punch through the card. At the same time the card 849 is moved against ribbon 940c pushing the ribbon against print wheel 938, causing the printing wheel to exert pressure against the ribbon 940c, card 847, and bar 932, thus simultaneously punching the card and printing the data.

Upon completion of the printing and punching operation, as the main operating handle completes its cycle, the punching apparatus 865 moves back to its rest position as the handle is returned to its start or rest position.

As the operating handle is moved downwardly on the first punching operation the digit sector gears 922 are locked in position by means of a toggle action mechanism shown in FIG. 21b. As will be described more fully hereinafter, the apparatus is arranged to punch the same information on the two portions of the card by moving the carriage and thus relocating the card opposite the punching mechanism. Accordingly, it is desired to lock the amount set for the duration of the two punching operations. Means are provided which first lock the digital setting and then release this setting, thus clearing the register, upon return of the carriage to the first punching position on the ensuing card.

As the main operating shaft 867 rotates counterclockwise, lever 985 pulls link 986, causing toggle 987 to move into its extended position, thus forcing bail 988 to engage the teeth of sector gears 922–922d. Bail 988 extends across all five sector gears so as to lock all into their set position. Upon return of the operating handle, as link 986 advances to the right as viewed in FIG. 21b, it slips by spring-loaded cam 989; thus the release of the extended toggle 987 is prevented during the subsequent operation.

After the second printing has taken place, the carriage is returned manually, at which time roller 990 engages lever cam 989, pushing link 991 (pivotally mounted on link 986) to the left, thus opening toggle 987 and removing the bail 988 from the teeth of the sector gears 922. The weight of quick set members 920a–920d then return the sector gears 922–922d to their "at rest" position. The machine is now clear for the next cycle.

Referring now to FIG. 21a, there is shown means for limiting the maximum amount recordable by this device. As shown, the machine can record five digits. In terms of dollars it can record $999.99. Assume the machine is to be set for a $100.00 limit. Each of the sector gears has associated with it a holding pawl 931. The pawl is so arranged as to slip from tooth to tooth as the sector gear is moved in accordance with the downward movement of lever 920 to the desired setting. However, the holding pawl 931 is so shaped as to prevent self return of the sector gear to the rest position, unless the "error lever" is raised. The error lever 996a (FIG. 19) extends perpendicularly from shaft 996 out through the front of the case. Movement of the lever rocks shaft 996, pulling detent pawl 931 out of engagement with sector gear 922, releasing the sector gears.

Assuming the machine is to be set for a $100.00 limit the pawl spring 930 is disengaged from the hundreds digit sector gear 922d. This permits pawl 931 to drop out of engagement. Link 940 is pinned to lever arm 920d by pin 940a and a retaining ring 940b. The link 940 is subjected to a downward thrust by spring 941 attached to anchor bar 943. Stud 945, extending from link 940, extends through a slot in U shape member 947. Member 947 is provided with an upwardly extending portion and terminates in a loop 948. Loop 948 straddles gears 922–922c but does not extend in front of gear 922d.

As will be appreciated by reference to FIG. 20, in conjunction with FIGS. 21 and 21a, as lever 920d is raised, thus raising link 940, pin 945 moves member 947 in an arcuate fashion moving loop 948 inwardly. If the other sector gears 922 and 922c are in their zero position, 948 will move to the right. However, if any one of the other sector gears are in other than zero, then 948 will be blocked. As a result, this will prevent upward movement of the lever 920d and prevent the setting of the higher digits.

It will be noted that link 940 is provided with holes A′, B′, C′. Hole B′ could be used to couple link 940 to lever 920d. This will permit the operating of the machine for even $100.00 and even $200.00 amounts. By using hole C′ the machine may be operated for even hundred dollar amounts above $99.99 of $100.00, $200.00 and $300.00 denominations.

Referring now to FIG. 21c, where a linkage for releasing the detent pawls 931 at the completion of the operation is shown, pinned to link 986 there is provided a second lever 993 which travels on free rotating stud 994. As the quick set lever is operated and the sector gear is moved, stud 996 moves against cam surface 997, moving bell crank 998 so as to move lever 993 to a downward position. As the main operating handle is returned on the subsequent stroke, linkage 986 moves to the left carrying with it link 993, which interferes with lever 995 coupled to shaft 996, thus rocking the detent pawls 931 out of engagement with the sector gears permitting the sector gears and interposers to return to their normal position.

Referring now to FIG. 23, which is a rear view of the machine, the carriage is moved to the right as viewed in the drawing, by pulling button 913, which is attached to the carriage head. The machine is then in its open or initial punching position. After the first punching has been completed, bell crank 898 (FIG. 24), which is attached to the main operating shaft, releases a pawl latched into a notch in member 901 on the return stroke of the operating handle. This action releases the carriage permitting it to move left (FIG. 22) to the second punching position automatically through the action of spring 1001. The spring is a "Negator" constant tension spring 1001 which is tensioned upon moving the carriage to the right and which will now wind itself up about spool 1002 at a constant rate of speed. Member 1006 is an anchor for the fixed end. Barrel 1003 rotates about pivot 1004 to which it is secured by a snap ring. The carriage will come to rest by means of shock absorber 1008 which seats itself against stop 1009 thus indexing the card.

What is claimed is:

1. A printing and perforating machine, including in combination: a carriage for receiving a tabulator card to be perforated; a punch and die set positioned for perforating a tabulator card positioned in said carriage;

means to receive a master identification card provided with perforations indicative of an identification number; perforation sensing means; means for locking the master identification card in proper orientation with respect to said perforation sensing means; means for sensing the position of said card and preventing operation of said machine when said master identification card is improperly oriented; means controlled by said perforation sensing means to punch said tabulator card with data corresponding to data carried by the master identification card; a paper supply; rotatable serial number indicia bearing print wheels; means to advance the setting of said serial number print wheels automatically by one digit whenever a said identification card is inserted; means for printing a transaction date; means for printing an amount; means for printing indicia corresponding to an item for which an amount is to be printed; a plurality of freely moving punch members positioned in bores located in parallel vertical columns in said die member, a sufficient number of said columns being provided for recording of the serial number, date and quantity; an interposer member arranged to be moved vertically in a plane parallel with each of said columns; means for changing said serial number print wheels and the position of related interposers so as to position said interposers in the path of selected ones of said punch members corresponding to the serial number digits to be printed; means for changing the date print wheel setting and simultaneously changing the position of an associated interposer in the path of corresponding date punches; means for varying the amount to be recorded and adjusting the position of an associated print wheel and interposers; means for selecting an item and means associated therewith for moving said carriage so as to position said tabulator card with an area of said card indicative of the item to be punched opposite said quantity punches; actuating means for printing data on said paper and for simultaneously perforating said tabulator card; a locking linkage associated with said last named actuating means for printing for preventing repeated printing of date and serial number; and means to advance said paper after each printing to expose a fresh printing surface.

2. A printing and perforating machine, including in combination: a carriage for receiving a tabulator card to be perforated; a die member provided with a slot for receiving the tabulator card positioned in said carriage; means to receive in turn a master identification card provided with perforations indicative of an identification number and a secondary identification card having identification stored therein in the form of perforations; perforation sensing means; means for locking the master identification card in proper orientation with respect to said perforation sensing means; means for sensing the position of said card and preventing operation of said machine when said master identification card is improperly oriented; means to sense the perforations; a plurality of punches freely movable in bores in said die member; means controlled by said perforation sensing means for restraining movement of selected punches; means for moving said die and said selected punches relative to each other so as to punch said tabulator card with data corresponding to data carried by the master identification card; means for preventing the punching of the tabulator card with other than the master identification card information when said master identification card is positioned in said apparatus; means for locking said secondary identification card in operating position with respect to said perforation sensing means; means for verifying the proper positioning of said tabulator card for receiving data from said said secondary identification card; means for preventing punching of said tabulator card if improperly positioned; means for punching said tabulator card with said secondary identification card information; a paper supply; rotatable serial number indicia bearing print wheels; means to advance the setting of said serial number print wheels automatically by one digit whenever a secondary identification card is replaced; means for printing a transaction date; means for changing said transaction date; means for printing an amount; means for printing indicia corresponding to an item for which an amount is to be printed; a plurality of freely moving punch members positioned in bores located in parallel vertical columns in said die member, a sufficient number of said columns being provided for recording of the serial number, date and quantity; an interposer member arranged to be moved vertically in a plane parallel with each of said columns; means for changing said serial number print wheels and the position of related interposers so as to position said interposers in the path of selected ones of said punch members corresponding to the serial number digits to be printed; means for changing the date print wheel setting and simultaneously changing the position of an associated interposer in the path of corresponding date punches; means for varying the amount to be recorded and adjusting the position of an associated print wheel and interposers; means for selecting an item and means associated therewith for moving said carriage so as to position said tabuluator card with an area of said card indicative of the item to be punched opposite said quantity punches; actuating means for printing data on said paper and for simultaneously perforating said tabulator card; a locking linkage associated with said last named actuating means for printing for preventing repeated printing of date and serial number; and means to advance said paper after each printing to expose a fresh printing surface.

3. A device for repeated printing and punching of information on a tabulator card comprising in combination: a punch and die set; a print wheel; a movable carriage adapted to receive said card; means to move said carriage to position a first portion of said card in operating relationship with said punch and die set and said print wheel; means for setting a punch arrangement corresponding to information to be punched and means co-operating therewith for setting said print wheel to simultaneously print the same information on the card; means for actuating said punch and die set and said print wheel to punch and print the card; means for retaining the set information; means for shifting said carriage to position the card with a fresh information surface in operative relationship with said punch and die set and said print wheel; means for providing a second printing and punching operation; and means for returning said carriage to a starting position and for simultaneously clearing the set data.

4. In a device for punching holes in a tabulator card in accordance with a desired pattern, the combination comprising: a punch and die set provided with a plurality of independent punch members; an interposer arranged to selectively intercept a desired one of a plurality of said punch members; a retracting lever connected to said interposer and adapted to traverse an angular path as said interposer is raised; a gear; a type wheel; a rack engaging said gear and adapted to rotate said type wheel to bring into printing position a digit corresponding to a selected punch; and means pivoting said rack on said retracting lever, the pivot point for said rack being a distance from the pivot point of the retracting lever such that the rack moves in increments each of which corresponds to the circular pitch of said gear.

5. A register apparatus for recording data, by punching, on a tabulator card including: means for insertion of a master identification card and a secondary identification card; means to record information provided by said master identification card on a tabulator card; means for sensing the presence of said secondary identification card; means for recording the transaction date; means for recording a consecutive serial number for the transaction; means for automatically changing the serial number each time a secondary identification card is inserted; means for indicating categories for which amounts are to be recorded; means for setting amounts to be recorded; means for selectively moving the tabulator card, to position a portion of the card assigned to a particular category so as to record data related to the selected category in a particular position on said card; and means to prevent more than one recording of the secondary identification data on a said tabulator card.

6. In combination with means for dual recording of a bit of information by printing a record sheet and punching a record card in a two column code: a setting gear; means for moving said setting gear; a geared print wheel carrying a plurality of indicia about its periphery, coupled to said setting gear; a pair of cams adapted to be adjusted by said setting gear in synchronization with said print wheel; a die carrying two columns of bores; punch members freely slidable in said bores; means to support a card transverse to said bores; means to restrain movement of selected ones of said punch members, wherein said restraining means comprise interposer members adapted to be moved in the plane of each of said columns; means to move said die so as to cause said restrained punch members to punch said card; a rack coupled to each of said interposers; a sector gear engaged with each said rack; and means extending from each of said sector gears to intersect one of said cams so as to limit the movement of the sector gear, to select the punch to be restrained to punch the corresponding information bit on the record card.

References Cited in the file of this patent

UNITED STATES PATENTS

| | | |
|---|---|---|
| 1,320,673 | Carroll et al. | Nov. 4, 1919 |
| 1,506,382 | Peirce | Aug. 26, 1924 |
| 2,050,745 | Woodruff et al. | Aug. 11, 1936 |
| 2,176,145 | Nelson | Oct. 17, 1939 |
| 2,229,905 | Sundstrand | Jan. 28, 1941 |
| 2,768,691 | Cooper et al. | Oct. 30, 1956 |